United States Patent
Gillott

(10) Patent No.: US 11,573,343 B2
(45) Date of Patent: Feb. 7, 2023

(54) MARINE OBJECT DETECTION SURVEY HAVING SOURCE CROSS CABLE

(71) Applicant: Magseis FF LLC, Houston, TX (US)

(72) Inventor: Graham Gillott, Arona (IT)

(73) Assignee: Magseis FF LLC, Houston, TX (US)

(*) Notice: Subject to any disclaimer, the term of this patent is extended or adjusted under 35 U.S.C. 154(b) by 328 days.

(21) Appl. No.: 16/446,393

(22) Filed: Jun. 19, 2019

(65) Prior Publication Data
US 2020/0400850 A1  Dec. 24, 2020

(51) Int. Cl.
| | | |
|---|---|---|
| *G01V 1/38* | (2006.01) | |
| *G01V 1/20* | (2006.01) | |
| *B63B 21/66* | (2006.01) | |

(52) U.S. Cl.
CPC ............ *G01V 1/3808* (2013.01); *B63B 21/66* (2013.01); *G01V 1/201* (2013.01); *G01V 1/3817* (2013.01); *G01V 1/3843* (2013.01); *G01V 1/3852* (2013.01); *G01V 2210/1293* (2013.01); *G01V 2210/1423* (2013.01); *G01V 2210/1427* (2013.01); *G01V 2210/16* (2013.01)

(58) Field of Classification Search
CPC .. G01V 1/3808; G01V 1/3843; G01V 1/3817; G01V 1/201; G01V 2210/1293; G01V 2210/16; G01V 2210/1423; G01V 1/3852; G01V 2210/1427; B63B 21/66
See application file for complete search history.

(56) References Cited

U.S. PATENT DOCUMENTS

| | | | |
|---|---|---|---|
| 4,330,873 A | 5/1982 | Peterson | |
| 8,559,265 B2 * | 10/2013 | Moldoveanu | ........ G01V 1/3808 367/16 |
| 2002/0174817 A1 * | 11/2002 | Semb | ..................... B63B 21/66 114/244 |
| 2005/0219949 A1 | 10/2005 | Taner et al. | |
| 2008/0029012 A1 * | 2/2008 | Stokkeland | .......... G01V 1/3826 114/253 |

(Continued)

FOREIGN PATENT DOCUMENTS

| | | | |
|---|---|---|---|
| EP | 3 088 919 A1 | 11/2016 | |
| GB | 2529463 A * | 2/2016 | ............. B63B 21/66 |
| WO | WO-2015/175766 A1 | 11/2015 | |

OTHER PUBLICATIONS

International Search Report and Written Opinion for PCT Appln. Ser. No. PCT/US2019/044747 dated Feb. 26, 2020 (17 pages).

*Primary Examiner* — Ian J Lobo
(74) *Attorney, Agent, or Firm* — Sage Patent Group

(57) ABSTRACT

A seabed object detection system is provided. The system can include a receiver array including a first streamer and a second streamer. The system can include a first plurality of receivers coupled with the first streamer and a second plurality of receivers coupled with the second streamer. The system can include a receiver array cross-cable to couple with the first streamer and the second streamer. The system can include a source array including a first source and a second source. The system can include a first source cable coupled with the first source and a second source cable coupled with the second source. The system can include a source array cross-cable to couple with the first source cable and the second source cable. The system can include a first lateral cable to couple with a first diverter and second lateral cable to couple with a second diverter.

19 Claims, 10 Drawing Sheets

(56) References Cited

U.S. PATENT DOCUMENTS

| | | | |
|---|---|---|---|
| 2008/0175097 A1* | 7/2008 | Storteig | G01V 1/3861 |
| | | | 367/16 |
| 2009/0050044 A1* | 2/2009 | Stokkeland | G01V 1/3826 |
| | | | 114/244 |
| 2013/0010571 A1* | 1/2013 | Sudow | B63B 21/66 |
| | | | 367/16 |
| 2016/0238730 A1* | 8/2016 | Malling | G01V 1/3808 |
| 2016/0349393 A1* | 12/2016 | Lambert | G01V 1/201 |
| 2017/0168182 A1 | 6/2017 | Long | |
| 2017/0293042 A1* | 10/2017 | Dudley | G05D 1/0206 |
| 2018/0059271 A1* | 3/2018 | Simonnot | G01V 1/202 |
| 2019/0176936 A1 | 6/2019 | Le Goff | |
| 2020/0183038 A1* | 6/2020 | Brurok | G01V 1/3817 |
| 2020/0191986 A1* | 6/2020 | Lindberg | B63B 21/66 |

* cited by examiner

MARINE OBJECT DETECTION SURVEY HAVING SOURCE CROSS CABLE

BACKGROUND

Seismic or other operations performed on a piece of earth can identify subterranean characteristics or features of the analyzed piece of earth

SUMMARY

At least one aspect of the present disclosure is directed to a seabed object detection system which can include a receiver array. The receiver array can include a first streamer and a second streamer. The seabed object detection system can include a first plurality of receivers coupled with the first streamer. The seabed object detection system can include a second plurality of receivers coupled with the second streamer. The seabed object detection system can include a receiver array cross-cable to couple with the first streamer at a first streamer connection point and to couple with the second streamer at a second streamer connection point. The seabed object detection system can include a source array comprising a first source and a second source. The seabed object detection system can include a first source cable coupled with the first source. The seabed object detection system can include a second source cable coupled with the second source. The seabed object detection system can include a source array cross-cable to couple with the first source cable at a first source attachment point and to couple with the second source cable at a second source attachment point. The seabed object detection system can include a first lateral cable to couple with a first diverter. The first lateral cable can couple with the source array cross-cable at a first source array cross-cable connection point. The first source array cross-cable connection point can be closer to the first diverter than a first lateral cable proximal end. The seabed object detection system can include a second lateral cable to couple with a second diverter. The second lateral cable can couple with the source array cross-cable at a second source array cross-cable connection point. The second source array cross-cable connection point can be closer to the second diverter than a second lateral cable proximal end.

At least one aspect of the present disclosure is direct to a method of seabed object detection. The method can include providing a receiver array. The receiver array can include a first streamer and a second streamer. The method can include coupling a first plurality of receivers with the first streamer. The method can include coupling a second plurality of receivers with the second streamer. The method can include coupling a receiver array cross-cable with the first streamer at a first streamer connection point. The method can include coupling the receiver array cross-cable with the second streamer at a second streamer connection point. The method can include providing a source array comprising a first source and a second source. The method can include coupling a first source cable with the first source. The method can include coupling a second source cable with the second source. The method can include coupling a source array cross-cable with the first source cable at a first source attachment point. The method can include coupling the source array cross-cable with the second source cable at a second source attachment point. The method can include coupling a first lateral cable with a first diverter. The first lateral cable can couple with the source array cross-cable at a first source array cross-cable connection point. The first source array cross-cable connection point can be closer to the first diverter than a first lateral cable proximal end. The method can include coupling a second lateral cable with a second diverter. The second lateral cable can couple with the source array cross-cable at a second source array cross-cable connection point. The second source array cross-cable connection point can be closer to the second diverter than a second lateral cable proximal end.

At least one aspect of the present disclosure is direct to a method of seabed object detection. The method can include providing a seabed object detection system. The seabed object detection system can include a receiver array. The receiver array can include a first streamer and a second streamer. The seabed object detection system can include a first plurality of receivers coupled with the first streamer. The seabed object detection system can include a second plurality of receivers coupled with the second streamer. The seabed object detection system can include a receiver array cross-cable to couple with the first streamer at a first streamer connection point and to couple with the second streamer at a second streamer connection point. The seabed object detection system can include a source array comprising a first source and a second source. The seabed object detection system can include a first source cable coupled with the first source. The seabed object detection system can include a second source cable coupled with the second source. The seabed object detection system can include a source array cross-cable to couple with the first source cable at a first source attachment point and to couple with the second source cable at a second source attachment point. The seabed object detection system can include a first lateral cable to couple with a first diverter. The first lateral cable can couple with the source array cross-cable at a first source array cross-cable connection point. The first source array cross-cable connection point can be closer to the first diverter than a first lateral cable proximal end. The seabed object detection system can include a second lateral cable to couple with a second diverter. The second lateral cable can couple with the source array cross-cable at a second source array cross-cable connection point. The second source array cross-cable connection point can be closer to the second diverter than a second lateral cable proximal end.

At least one aspect of the present disclosure is direct to a method of seabed object detection. The method can include providing a seabed object detection system. The seabed object detection system can include a receiver array. The receiver array can include a first streamer and a second streamer. The seabed object detection system can include a first plurality of receivers coupled with the first streamer. The seabed object detection system can include a second plurality of receivers coupled with the second streamer. The seabed object detection system can include a receiver array cross-cable to couple with the first streamer at a first streamer connection point and to couple with the second streamer at a second streamer connection point. The seabed object detection system can include a source array comprising a first source and a second source. The seabed object detection system can include a first source cable coupled with the first source. The seabed object detection system can include a second source cable coupled with the second source. The seabed object detection system can include a source array cross-cable to couple with the first source cable at a first source attachment point and to couple with the second source cable at a second source attachment point. The seabed object detection system can include a first lateral cable to couple with a first diverter. The first lateral cable can couple with the source array cross-cable at a first source cross-cable connection point can be closer to the first diverter than a first lateral cable proximal end. The seabed object detection system can include a second lateral cable to couple with a second diverter. The second lateral cable can couple with the source array cross-cable at a second source array cross-cable connection point. The second source array cross-cable connection point can be closer to the second diverter than a second lateral cable proximal end.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys described herein can obtain information relating to subsurface features. An acoustic signal can reflect off subsurface lithological formations and be acquired, analyzed and interpreted. However, reflection-based surveys typically cover a narrow area and collect a sparse set of data, both of which are factors that contribute to an increased time required to complete the surveys. Additionally, small shallow objects such as boulders buried in the seabed may be difficult to precisely image due to the resolution capabilities of reflection-based surveys. These small objects can complicate or delay wind turbine, marine or ocean bottom constructions that are fixed to the seabed, as well as the placement of cable connections and communication lines between these wind turbine, marine or ocean bottom constructions.

The present disclosure is directed to systems and methods for seabed object detection. Due to the limitations of reflection-based surveys, it can be challenging to detect small shallow objects in the seabed. Inefficiencies related to increased survey time, such as a greater risk of weather-based delays, can increase the operating cost of these surveys without providing an accurate map of obstacles in the seabed. Systems and methods of the present disclosure can solve these and other problems associated with performing a survey to detect seabed objects.

For example, the seabed object detection system can provide an accurate map of obstacles in the seabed. The system can include a receiver array. The receiver array can include a first streamer and a second streamer. The system can include a first plurality of receivers coupled with the first streamer and a second plurality of receivers coupled with the second streamer. The system can include a receiver array cross-cable to couple with the first streamer and the second streamer. The system can include a source array. The source array 127 can include a first source and a second source. The system can include a first source cable coupled with the first source and a second source cable coupled with the second source. The system can include a source array cross-cable to couple with the first source cable and the second source cable. The system can include a first lateral cable to couple with a first diverter and second lateral cable to couple with a second diverter.

Figure 1:
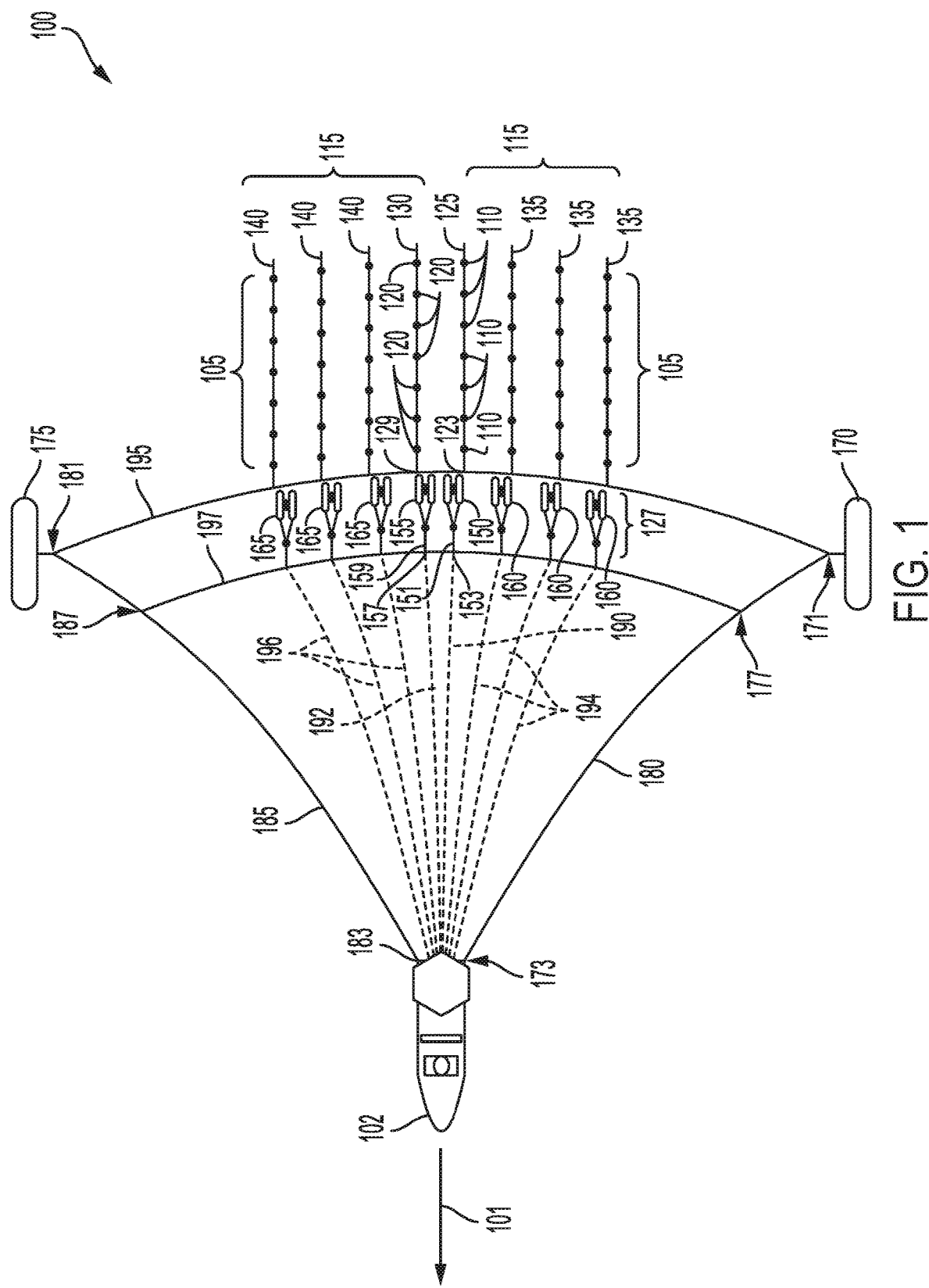
FIG. 1 illustrates a seabed object detection system according to an example implementation.

FIG. 1 illustrates a seabed object detection system 100 illustrative of a marine environment in which the systems and methods of the present disclosure can perform a seismic survey to detect seabed objects. The seabed object detection system 100 can include a receiver array 105. The receiver array 105 can include a first streamer 125. The receiver array 105 can include a second streamer 130. For example, the first streamer 125 may be a cable (e.g., a surface marine cable), an assembly of wires, or any component capable of connecting a receiver to a recording device which may be located on a vessel 102. The first streamer 125 can couple to a receiver array cross-cable 195. The first streamer 125 can couple to the receiver array cross-cable 195 at a first streamer connection point 123. For example, the second streamer 130 may be a cable (e.g., a surface marine cable), an assembly of wires, or any component capable of connecting a receiver to a recording device which may be located on a vessel 102. The second streamer 130 can couple to the receiver array cross-cable 195. The second streamer 130 can couple to the receiver array cross-cable 195 at a second streamer connection point 129.

The seabed object detection system 100 can include a first plurality of receivers 110. The first plurality of receivers 110 can be coupled with the first streamer 125. The first plurality of receivers 110 can be disposed on the first streamer 125. The first plurality of receivers 110 can be coupled to the first streamer 125 along a line. The first plurality of receivers 110 can be evenly spaced along the first streamer 125. The first plurality of receivers 110 can receive diffraction data diffracted off an object in a seabed. For example, a receiver of the first plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The first plurality of receivers 110 can be configured to detect acoustic waves that are reflected by seabed objects. The first plurality of receivers 110 can be configured to detect acoustic waves that are diffracted by seabed objects. The first plurality of receivers 110 can detect diffraction data from edges of objects. For example, the first plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the first plurality of receivers 110 can detect objects with facets, edges, sharp boundaries, or textures. The seabed objects can be completely buried within the seabed. The seabed objects can be partially buried within the seabed.

The seabed object detection system 100 can include a second plurality of receivers 120. The second plurality of receivers 120 can be coupled with the second streamer 130. The second plurality of receivers 120 can be disposed on the second streamer 130. The second plurality of receivers 120 can be coupled to the second streamer 130 along a line. The second plurality of receivers 120 can be evenly spaced along the second streamer 130. The second plurality of receivers 120 can receive diffraction data diffracted off an object in a seabed. For example, a receiver of the second plurality of receivers 120 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The second plurality of receivers 120 can be configured to detect acoustic waves that are reflected by seabed objects. The second plurality of receivers 120 can be configured to detect acoustic waves that are diffracted by seabed objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The second plurality of receivers 120 can detect objects with irregular surface features. For example, the second plurality of receivers 120 can detect objects with facets, edges, sharp boundaries, or textures. The seabed objects can be completely buried within the seabed. The seabed objects can be partially buried within the seabed.

The seabed object detection system 100 can include a receiver array cross-cable 195. The receiver array cross-cable 195 can couple with the first streamer 125 at the first streamer connection point 123. For example, the first streamer 125 can be tied to the receiver array cross-cable 195 at the first streamer connection point 123. The first streamer connection point 123 can be closer to a second diverter 175 than to a first diverter 170. The first streamer connection point 123 can be closer to the first diverter 170 than to the second diverter 175. The receiver array cross-cable 195 can couple with the first streamer 125 at a first end of the first streamer 125. The first streamer 125 can couple to the receiver array cross-cable 195 at multiple connections points. The receiver array cross-cable 195 can couple with the second streamer 130 at the second streamer connection point 129. For example, the second streamer 130 can be tied to the receiver array cross-cable 195 at the second streamer connection point 129. The second streamer connection point 129 can be closer to the first diverter 170 than to the second diverter 175. The second streamer connection point 129 can be closer to the second diverter 175 that to the first diverter 170. The receiver array cross-cable 195 can couple with the second streamer 130 at a first end of the second streamer 130. The second streamer 130 can couple to the receiver array cross-cable 195 at multiple connections points. The receiver array cross-cable 195 can couple with a source array cross-cable 197 at a first source array cross-cable connection point 177. The receiver array cross-cable 195 can couple with a first lateral cable 180. The receiver array cross-cable 195 can couple with the first lateral cable 180 at a first lateral cable distal end 171. The receiver array cross-cable 195 can couple with a first diverter 170. The receiver array cross-cable 195 can couple with the source array cross-cable 197 at a second source array cross-cable connection point 187. The receiver array cross-cable 195 can couple with a second diverter 175. The receiver array cross-cable 195 can couple with a second lateral cable 185. The receiver array cross-cable 195 can couple with the second lateral cable 185 at a second lateral cable distal end 181. The receiver array cross-cable 195 may be a power cable to transmit electrical power from the vessel 102 to the first plurality of receivers 110. The receiver array cross-cable 195 may be a power cable to transmit electrical power from the vessel 102 to the second plurality of receivers 120.

The seabed object detection system 100 can include a source array 127. The source array 127 can include a first source 150. For example, the first source 150 can generate a source shot. The first source 150 can generate acoustic waves. The source array 127 can generate an acoustic signal to be received by the receiver array 105. For example, the source array 127 can include the first source 150 coupled to a source array cross-cable 197. The source array 127 including the first source 150 can include a pattern of sources. The source array 127 can include a second source 155. For example, the second source 155 can generate a source shot. The second source 155 can generate acoustic waves. The source array 127 can generate an acoustic signal to be received by the receiver array 105. For example, the source array 127 can include the second source 155 coupled to the source array cross-cable 197. The source array 127 including the second source 155 can include a pattern of sources.

The seabed object detection system 100 can include a first source cable 151. The first source cable 151 can couple with the first source 150. For example, the first source cable 151 can split into two cables that both couple with the first source 150. The first source cable 151 can connect to the first source 150. The first source cable 151 can connect to the first source 150 through multiple cables. The first source cable 151 may be a cable (e.g., a surface marine cable), an assembly of wires, or any component capable of connecting a source to a power supple on the vessel 102. The first source cable 151 can couple with the first source 150 at a first end. The first source cable 151 may be a tether, rope, or chain. The first source cable 151 can be shorter than a source array cross-cable 197. The source array cross-cable 197 can be longer than the first source cable 151.

The seabed object detection system 100 can include a second source cable 159. The second source cable 159 can couple with the second source 155. For example, the second source cable 159 can split into two cables that both couple with the second source 155. The second source cable 159 can connect to the second source 155. The second source cable 159 can connect to the second source 155 through multiple cables. The second source cable 159 may be a cable (e.g., a surface marine cable), an assembly of wires, or any component capable of connecting a source to a power supple on the vessel 102. The second source cable 159 can couple with the second source 155 at a first end. The second source cable 159 may be a tether, rope, or chain. The second source cable 159 can be shorter than the source array cross-cable 197. The source array cross-cable 197 can be longer than the second source cable 159.

The seabed object detection system 100 can include a source array cross-cable 197. The source array cross-cable 197 can couple with the first source 150 at a first source attachment point 153. For example, the source array cross-cable 197 can couple with the first source 150 through a first source cable 151. The source array cross-cable 197 can couple with a second end of the first source cable 151. The source array cross-cable 197 can connect with the first source cable 151 to couple with the first source 150. The first source attachment point 153 can be multiple points of connection between the source array cross-cable 197 and the first source cable 151. The first source attachment point 153 can be multiple points of connection between the source array cross-cable 197 and the first source 150. The source array cross-cable 197 can couple with the second source 155 at a second source attachment point 157. For example, the source array cross-cable 197 can couple with the second source 155 through a second source cable 159. The source array cross-cable 197 can couple with a second end of the second source cable 159. The source array cross-cable 197 can connect with the second source cable 159 to couple with the second source 155. The second source attachment point 157 can be multiple points of connection between the source array cross-cable 197 and the second source cable 159. The second source attachment point 157 can be multiple points of connection between the source array cross-cable 197 and the second source 155. The source array cross-cable 197 may be a power cable to transmit electrical power from the vessel 102 to the first source 150. The source array cross-cable 197 may be a power cable to transmit electrical power from the vessel 102 to the second source 155.

The first source 150 can be closer to the first streamer 125 than to the first source attachment point 153. For example, the first source 150 can be more than halfway the distance from the first source attachment point 153 to the first streamer 125. The first source 150 can be closer to the second streamer 130 than to the second source attachment point 157. For example, the first source 150 can be more than halfway the distance from the second source attachment point 157 to the second streamer 130. The first source 150 can be closer to the third streamer 135 than to the first source attachment point 153. For example, the first source 150 can be more than halfway the distance from the first source attachment point 153 to the third streamer 135. The first source 150 can be closer to the first source attachment point 153 than to the third streamer 135. For example, the first source 150 can be more than halfway the distance from the third streamer 135 to the first source attachment point 153.

The second source 155 can be closer to the second streamer 130 than to the second source attachment point 157. For example, the second source 155 can be more than halfway the distance from the second source attachment point 157 to the second streamer 130. The second source 155 can be closer to the first streamer 125 than to the first source attachment point 153. For example, the second source 155 can be more than halfway the distance from the first source attachment point 153 to the first streamer 125. The second source 155 can be closer to the fourth streamer 140 than to the second source attachment point 157. For example, the second source 155 can be more than halfway the distance from the second source attachment point 157 to the fourth streamer 140. The second source 155 can be closer to the second source attachment point 157 than to the fourth streamer 140. For example, the second source 155 can be more than halfway the distance from the fourth streamer 140 to the second source attachment point 157.

The seabed object detection system 100 can include a first lateral cable 180 to couple with a first diverter 170. The first lateral cable 180 can couple with the source array cross-cable 197 at a first source array cross-cable connection point 177. For example, the first lateral cable 180 may be a cable (e.g., a surface marine cable), an assembly of wires, a tether, or a rope. The first lateral cable 180 can connect with the source array cross-cable 197 at the first source array cross-cable connection point 177. The first source array cross-cable connection point 177 can be closer to the first diverter 170 than a first lateral cable proximal end 173. The first source array cross-cable connection point 177 can be closer to a first lateral cable distal end 171 than the first lateral cable proximal end 173. The first lateral cable 180 can couple with the receiver array cross-cable 195. The receiver array cross-cable 195 can couple with the first diverter 170. The first lateral cable 180 can couple directly to the first diverter 170. The first lateral cable 180 can couple to the first diverter 170 through a secondary cable. The first lateral cable 180 can be coupled with the receiver array cross-cable 195 to connect with the first diverter 170. The first lateral cable 180 can be coupled with the receiver array cross-cable 195 to connect with the first diverter 170 at the first lateral cable distal end 171. The first lateral cable 180 may be a power cable to transmit electrical power from the vessel 102 to the first source 150. The first lateral cable 180 may be a power cable to transmit electrical power from the vessel 102 to the second source 155. The first lateral cable 180 may be a power cable to transmit electrical power from the vessel 102 to the first plurality of receivers 110. The first lateral cable 180 may be a power cable to transmit electrical power from the vessel 102 to the second plurality of receivers 120.

The first diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seabed object detection system 100 can include a second lateral cable 185 to couple with a second diverter 175. The second lateral cable 185 can couple with the source array cross-cable 197 at a second source array cross-cable connection point 187. For example, the second lateral cable 185 may be a cable (e.g., a surface marine cable), an assembly of wires, a tether, or a rope. The second lateral cable 185 can connect with the source array cross-cable 197 at the second source array cross-cable connection point 187. The second source array cross-cable connection point 187 can be closer to the second diverter 175 than a second lateral cable proximal end 183. The second source array cross-cable connection point 187 can be closer to a second lateral cable distal end 181 than the second lateral cable proximal end 183. The second lateral cable 185 can couple with the receiver array cross-cable 195. The receiver array cross-cable 195 can couple with the second diverter 175. The second lateral cable 185 can couple directly to the second diverter 175. The second lateral cable 185 can couple to the second diverter 175 through a secondary cable. The second lateral cable 185 can be coupled with the receiver array cross-cable 195 to connect with the second diverter 175. The second lateral cable 185 can be coupled with the receiver array cross-cable 195 to connect with the second diverter 175 at the second lateral cable distal end 181. The second lateral cable 185 may be a power cable to transmit electrical power from the vessel 102 to the first source 150. The second lateral cable 185 may be a power cable to transmit electrical power from the vessel 102 to the second source 155. The second lateral cable 185 may be a power cable to transmit electrical power from the vessel 102 to the first plurality of receivers 110. The second lateral cable 185 may be a power cable to transmit electrical power from the vessel 102 to the second plurality of receivers 120.

The second diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The second diverter 175 can be connected by a cable to the first diverter 170. For example, the second diverter 175 can be connected by a receiver array cross-cable 195 to the first diverter 170.

The seabed object detection system 100 can include a vessel 102. The vessel 102 can tow the receiver array 105. The vessel 102 can tow the source array 127. The vessel 102 can tow the source array 127 in a tow direction 101. The vessel 102 can tow the receiver array 105 in a tow direction 101. The vessel can tow the source array cross-cable 197 ahead of the receiver array cross-cable 195 relative to the tow direction 101. For example, the vessel 102 can tow the source array cross-cable 197 in the tow direction 101. The vessel 102 can tow the receiver array cross-cable 195 in the tow direction 101. A portion of the source array cross-cable 197 can be ahead of a portion of the receiver array cross-cable 195 relative to the tow direction 101. The vessel 102 can be coupled to the first lateral cable 180. The vessel 102 can be coupled to the first lateral cable 180 at a first lateral cable proximal end 173. The vessel 102 can be coupled to the second lateral cable 185. The vessel 102 can be coupled to the second lateral cable 185 at a second lateral cable proximal end 183.

The seabed object detection system 100 can include a third streamer 135. The third streamer 135 can be located a first distance from the first streamer 125. The third streamer 135 can be located a first distance from the second streamer 130. The first distance can include distances between 5 meters and 30 meters. For example, the first distance can be 12.5 meters. The first distance can be less than 5 meters. The first distance can be greater than 30 meters. The third streamer 135 may be a cable (e.g., a surface marine cable), an assembly of wires, or any component capable of connecting a receiver to a recording device which may be located on the vessel 102. The receiver array 105 can include the third streamer 135. The receiver array 105 can include multiple third streamers 135. For example, the receiver array 105 can include one, two, three, or more third streamers 135.

The seabed object detection system 100 can include a fourth streamer 140. The fourth streamer 140 can be located a first distance from the first streamer 125. The fourth streamer 140 can be located a first distance from the second streamer 130. The first distance can include distances between 5 meters and 30 meters. For example, the first distance can be 12.5 meters. The first distance can be less than 5 meters. The first distance can be greater than 30 meters. The fourth streamer 140 may be a cable (e.g., a surface marine cable), an assembly of wires, or any component capable of connecting a receiver to a recording device which may be located on the vessel 102. The receiver array 105 can include the fourth streamer 140. The receiver array 105 can include multiple fourth streamers 140. For example, the receiver array 105 can include one, two, three, or more fourth streamers 140.

The seabed object detection system 100 can include a third source 160. The source array 127 can include a third source 160. The third source 160 can be located between the first streamer 125 and the third streamer 135. The third source 160 can be located between a first third streamer 135 and a second third streamer 135. The third source 160 can generate acoustic waves to be reflected off a seabed object and received by the first plurality of receivers 110. The third source 160 can generate acoustic waves to be diffracted off a seabed object and received by the first plurality of receivers 110. The source array 127 can include multiple third sources 160. For example, the source array 127 can include one, two, three, or more third sources 160. The third source 160 can generate acoustic waves to be reflected off a seabed object and received by the second plurality of receivers 120. The third source 160 can generate acoustic waves to be diffracted off a seabed object and received by the second plurality of receivers 120.

The seabed object detection system 100 can include a fourth source 165. The source array 127 can include a fourth source 165. The fourth source 165 can be located between the second streamer 130 and the fourth streamer 140. The fourth source 165 can be located between a first fourth streamer 140 and a second fourth streamer 140. The fourth source 165 can generate acoustic waves to be reflected off a seabed object and received by the first plurality of receivers 110. The fourth source 165 can generate acoustic waves to be diffracted off a seabed object and received by the first plurality of receivers 110. The source array 127 can include multiple fourth sources 165. For example, the source array 127 can include one, two, three, or more fourth sources 165. The fourth source 165 can generate acoustic waves to be reflected off a seabed object and received by the second plurality of receivers 120. The fourth source 165 can generate acoustic waves to be diffracted off a seabed object and received by the second plurality of receivers 120.

The seabed object detection system 100 can include a plurality of streamers 115. The plurality of streamers 115 can include the first streamer 125. The plurality of streamers 115 can include the second streamer 130. The plurality of streamers 115 can include one or more third streamers 135. For example, the plurality of streamers 115 can include three third streamers 135. The plurality of streamers 115 can include one or more fourth streamers 140. For example, the plurality of streamers 115 can include three fourth streamers 140. The plurality of streamers 115 can include exactly eight streamers. A plurality of receivers can be disposed on the third streamer 135. A plurality of receivers can be disposed on the fourth streamer 140.

The seabed object detection system 100 can include a plurality of sources. The plurality of sources can include the first source 150. The plurality of sources can include the second source 155. The plurality of sources can include one or more third sources 160. For example, the plurality of sources can include three third sources 160. The plurality of sources can include one or more fourth sources 165. For example, the plurality of sources can include three fourth sources 165. The plurality of sources can include exactly eight sources. The plurality of sources can generate an acoustic signal. The first plurality of receivers 110 can receive reflection data reflection off an object in the seabed 220. The second plurality of receivers 120 can receive reflection data reflected off an object in the seabed 220. The first source 150 can generate an acoustic signal. The first plurality of receivers 110 can receive reflection data reflection off an object in the seabed 220 and generated by the first source 150. The second plurality of receivers 120 can receive reflection data reflected off an object in the seabed 220 and generated by the first source 150. The second source 155 can generate an acoustic signal. The first plurality of receivers 110 can receive reflection data reflection off an object in the seabed 220 and generated by the second source 155. The second plurality of receivers 120 can receive reflection data reflected off an object in the seabed 220 and generated by the second source 155.

The seabed object detection system 100 can include a first power cable 190 to provide power to the first source 150. For example, the first power cable 190 may be a power cable to transmit electrical power from the vessel 102 to the first source 150. The first power cable 190 may be a power cable to transmit electrical power from the source array cross-cable 197 to the first source 150. The first power cable 190 may be multiple power cables. The first power cable 190 may connect to the source array cross-cable 197 at a first source attachment point 153.

The seabed object detection system 100 can include a second power cable 192 to provide power to the second source 155. For example, the second power cable 192 may be a power cable to transmit electrical power from the vessel 102 to the second source 155. The second power cable 192 may be a power cable to transmit electrical power from the source array cross-cable 197 to the second source 155. The second power cable 192 may be multiple power cables. The second power cable 192 may connect to the source array cross-cable 197 at a second source attachment point 157.

The seabed object detection system 100 can include additional cables. For example, the system 100 can include a third power cable 194. The third power cable 194 can transmit electrical power from the vessel 102 to the third source 160. The system 100 can include multiple third power cables 194. For example, the vessel 102 can transmit electrical power through one, two, three, or more third power cables 194 to one, two, three, or more third sources 160. The system 100 can include a fourth power cable 196. The fourth power cable 196 can transmit electrical power from the vessel 102 to the fourth source 165. For example, the vessel 102 can transmit electrical power through one, two, three, or more fourth power cables 196 to one, two, three, or more fourth sources 165.

The seabed object detection system 100 can include the first lateral cable 180 to couple with a vessel 102 at the first lateral cable proximal end 173. For example, the vessel 102 can be coupled to the first lateral cable 180 at the first lateral cable proximal end 173. The vessel 102 can include a connection point where the first lateral cable 180 couples to the vessel 102. The first lateral cable 180 can include a first lateral cable proximal end 173 and a first lateral cable distal end 171. The first lateral cable proximal end 173 of the first lateral cable 180 can be tied to the vessel 102. The first lateral cable proximal end 173 of the first lateral cable 180 can be engaged with the vessel 102.

The seabed object detection system 100 can include the second lateral cable 185 to couple with a vessel 102 at the second lateral cable proximal end 183. For example, the vessel 102 can be coupled to the second lateral cable 185 at the second lateral cable proximal end 183. The vessel 102 can include a connection point where the second lateral cable 185 couples to the vessel 102. The second lateral cable 185 can include a second lateral cable proximal end 183 and a second lateral cable distal end 181. The second lateral cable proximal end 183 of the second lateral cable 188 can be tied to the vessel 102. The second lateral cable proximal end 183 of the second lateral cable 185 can be engaged with the vessel 102.

Figure 2:
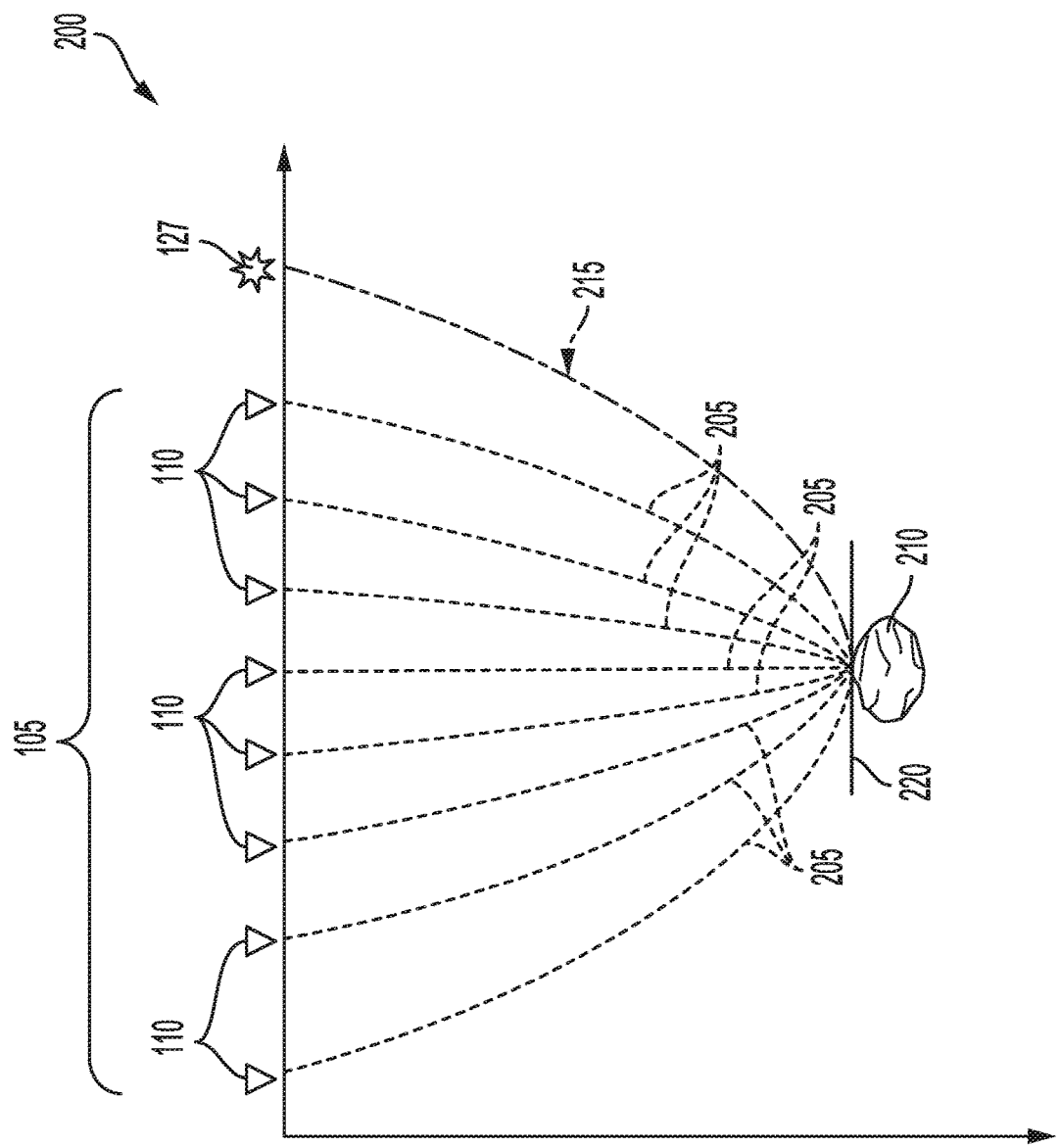
FIG. 2 illustrates a diffraction survey according to an example implementation.

FIG. 2 illustrates a diffraction survey 200. The diffraction survey 200 can include a receiver array 105 and a source array 127. The source array 127 can generate a source shot 215. The source shot 215 can travel through a medium (e.g., sea water) and diffract off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that diffract off the seabed object 210 may include diffraction data. The diffraction data may include diffracted waves 205. The receiver array 105 can receive diffraction data. For example, the receiver array 105 can receive the diffracted waves 205. The first plurality of receivers 110 of the receiver array 105 can receive diffraction data. For example, the first plurality of receivers 110 can receive the diffracted waves 205. A receiver of the first plurality of receivers 110 can receive the diffracted waves 205. The diffraction data can include diffracted waves 205 originating from a seabed object. The diffraction data can include diffracted waves 205 generated from a source shot 215. The second plurality of receivers 120 of the receiver array 105 can receive diffraction data. For example, the second plurality of receivers 120 can receive the diffracted waves 205. A receiver of the second plurality of receivers 120 can receive the diffracted waves 205. The diffraction data can include diffracted waves 205 originating from a seabed object. The diffraction data can include diffracted waves 205 generated from a source shot 215. The first plurality of receivers 110 can detect diffraction data from edges of objects. For example, the first plurality of receivers 110 can detect diffraction data originating from edges of large objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the first plurality of receivers 110 can detect objects with facets, edges, sharp boundaries, or textures. The second plurality of receivers 120 can detect objects with irregular surface features. For example, the second plurality of receivers 120 can detect objects with facets, edges, sharp boundaries, or textures.

The first plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the first plurality of receivers 110 of the receiver array 105 can detect diffracted waves from an object smaller than the Fresnel zone.

The second plurality of receivers 120 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the second plurality of receivers 120 of the receiver array 105 can detect diffracted waves from an object smaller than the Fresnel zone.

The source array 127 can generate acoustic waves. The acoustic waves can include a source shot 215. The acoustic waves can diffract off the object in the seabed. The receiver array 105 can receive diffracted waves originating from the object in the seabed. The central pair of sources can generate acoustic waves. The first source 150 can generate acoustic waves. The second source 155 can generate acoustic waves. A receiver of the first plurality of receivers 110 of the receiver array 105 can receive the diffracted waves. A receiver disposed on the first streamer 125 can receive the diffracted waves. A receiver disposed on the second streamer 130 can receive the diffracted waves. A receiver of the second plurality of receivers 120 of the receiver array 105 can receive the diffracted waves. A receiver disposed on the first streamer 125 can receive the diffracted waves. A receiver disposed on the second streamer 130 can receive the diffracted waves.

Figure 3:
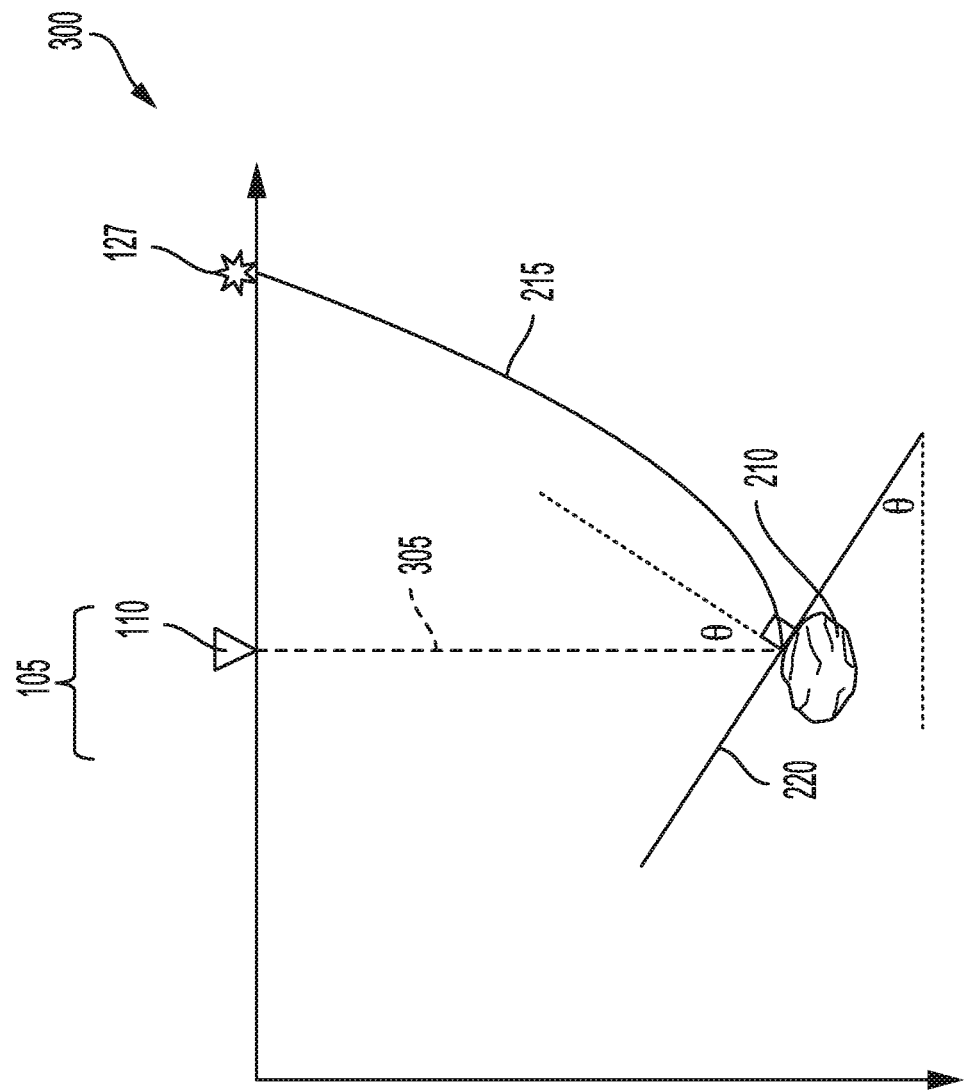
FIG. 3 illustrates a reflection survey according to an example implementation.

FIG. 3 illustrates a reflection survey 300. The reflection survey 300 can include a receiver array 105 and a source array 127. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data. The reflection data may include a reflected wave 305. The receiver array 105 can receive reflection data. For example, the receiver array 105 can receive the reflected wave 305. A receiver of the first plurality of receivers 110 can receive the reflected wave 305. A receiver of the second plurality of receivers 120 can receive the reflected wave 305. The reflection data can include a reflected wave 305 originating from a seabed object 210. The reflection data can include the reflected wave 305 generated from a source shot 215. The plurality of sources of the source array 127 can generate an acoustic signal. The first plurality of receivers 110 of the receiver array 105 can receive reflection data reflected off the object in the seabed. The reflection data can include a reflected wave 305. A receiver of the first plurality of receivers 110 can receive the reflected wave 305 reflected off the object in the seabed and generated by a source of the plurality of sources of the source array 127. The second plurality of receivers 120 of the receiver array 105 can receive reflection data reflected off the object in the seabed. The reflection data can include a reflected wave 305. A receiver of the second plurality of receivers 120 can receive the reflected wave 305 reflected off the object in the seabed and generated by a source of the plurality of sources of the source array 127.

Figure 4:
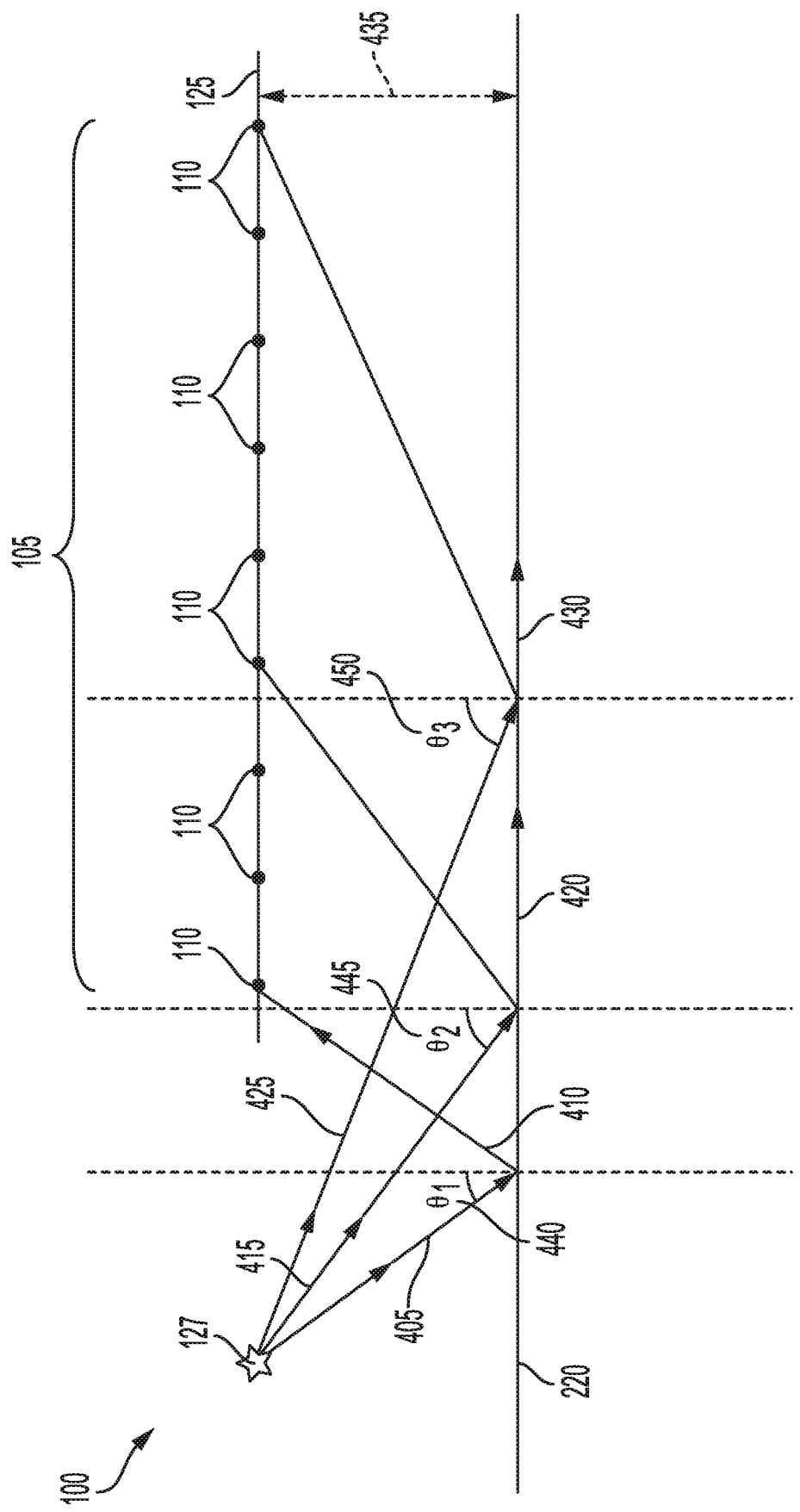
FIG. 4 illustrates a seabed object detection system according to an example implementation.

FIG. 4 illustrates a seabed object detection system 100. The seabed object detection system 100 can include a source array 127 and a receiver array 105. The source array 127 can generate a first source shot 405. The source array 127 can generate a second source shot 415. The source array 127 can generate a third source shot 425. The first source shot 405 can reflect off the seabed 220 at an angle, $\theta_1$ 440. The receiver array 105 can receive the wave reflected off the seabed 220 at an angle, $\theta_1$ 440. A receiver of the plurality of receivers 110 can receive the wave reflected off the seabed 220 at an angle, $\theta_1$ 440. The wave reflected off the seabed 220 can be a reflected wave 410. The angle, $\theta_1$ 440 can be less than a critical angle of reflection for a source of the source array 127.

The second source shot 415 can reflect off the seabed 220 at an angle, $\theta_2$ 445. For example, the angle, $\theta_2$ 445 can be a critical angle of reflection for the source of the source array 127. Instead of a wave reflected off the seabed 220, a refracted wave 420 is generated from the second source shot 415. The critical angle can include a critical angle of reflection. The critical angle can include a critical angle of incidence. The critical angle of incidence is the angle at which a refracted wave travels along an interface between two media. The critical angle can depend on a distance 435 between the seabed 220 and the receiver array 105. The distance 435 can be between 10 m and 100 meters. For example, the distance can be 15 m, 25 m, 50 m, or 75 m. The distance 435 can be less than 10 m. The distance 435 can be greater than 100 meters. The receiver array 105 does not receive a wave reflected off the seabed 220 at an angle, $\theta_2$ 445. A receiver of the first plurality of receivers 110 does not receive a wave reflected off the seabed 220 at an angle, $\theta_2$ 445. A receiver of the first plurality of receivers 110 can be disposed at a critical angle of reflection for a source of the source array 127. A receiver of the first plurality of receivers 110 can be disposed at a critical angle of reflection for a source of the plurality of sources of the source array 127. A receiver of the second plurality of receivers 120 does not receive a wave reflected off the seabed 220 at an angle, $\theta_2$ 445. A receiver of the second plurality of receivers 120 can be disposed at a critical angle of reflection for a source of the source array 127. A receiver of the second plurality of receivers 120 can be disposed at a critical angle of reflection for a source of the plurality of sources of the source array 127. The receiver disposed at a critical angle of reflection can receive diffraction data responsive to an acoustic source. The receiver disposed at a critical angle of reflection can receive diffraction data generated from the second source shot 415. The second source shot 415 can generate acoustic waves. The receiver disposed at a critical angle of reflection can receive diffraction data generated from the acoustic waves.

The third source shot 425 can reflect off the seabed 220 at an angle, $\theta_3$ 450. For example, the angle, $\theta_3$ 450 can be greater than a critical angle of reflection for the source of the source array 127. Instead of a wave reflected off the seabed 220, a refracted wave 430 is generated from the third source shot 425. The receiver array 105 does not receive a wave reflected off the seabed 220 at an angle, $\theta_3$ 450. A receiver of the first plurality of receivers 110 does not receive a wave reflected off the seabed 220 at an angle, $\theta_3$ 450. A receiver of the first plurality of receivers 110 can be disposed beyond a critical angle of reflection for a source of the source array 127. A receiver of the first plurality of receivers 110 can be disposed beyond a critical angle of reflection for a source of the plurality of sources of the source array 127. A receiver of the second plurality of receivers 120 does not receive a wave reflected off the seabed 220 at an angle, $\theta_3$ 450. A receiver of the second plurality of receivers 120 can be disposed beyond a critical angle of reflection for a source of the source array 127. A receiver of the second plurality of receivers 120 can be disposed beyond a critical angle of reflection for a source of the plurality of sources of the source array 127. The receiver disposed beyond a critical angle of reflection can receive diffraction data responsive to an acoustic source. The receiver disposed beyond a critical angle of reflection can receive diffraction data generated from the third source shot 425. The third source shot 425 can generate acoustic waves. The receiver disposed beyond a critical angle of reflection can receive diffraction data generated from the acoustic waves.

The receiver array 105 can be disposed a distance 435 above the seabed 220. For example, the receiver array 105 can be disposed 15 m to 50 m above the seabed (e.g., 15 m, 25 m, 40 m, 50 m). The receiver array 105 can be disposed at a distance 435 less than 15 m above the seabed. The receiver array 105 can be disposed at a distance 435 greater than 50 meters above the seabed. The first plurality of receivers 110 of the receiver array 105 can be disposed a distance 435 above the seabed 220. Each receiver of the first plurality of receivers 110 can be disposed at substantially the same distance 435 above the seabed 220. The receiver array 105 can be disposed a distance below the sea surface. The first plurality of receivers 110 of the receiver array 105 can be disposed a distance below the sea surface. The second plurality of receivers 120 of the receiver array 105 can be disposed a distance 435 above the seabed 220. Each receiver of the second plurality of receivers 120 can be disposed at substantially the same distance 435 above the seabed 220. The receiver array 105 can be disposed a distance below the sea surface. The second plurality of receivers 120 of the receiver array 105 can be disposed a distance below the sea surface. The source array 127 can be disposed a distance above the seabed 220. For example, the source array 127 can be disposed 15 m to 50 m above the seabed. The source array 127 can be disposed less than 15 m above the seabed. The source array 127 can be disposed greater than 50 m above the seabed. The receiver array 105 can be towed deeper than the source array 127.

Figure 5:
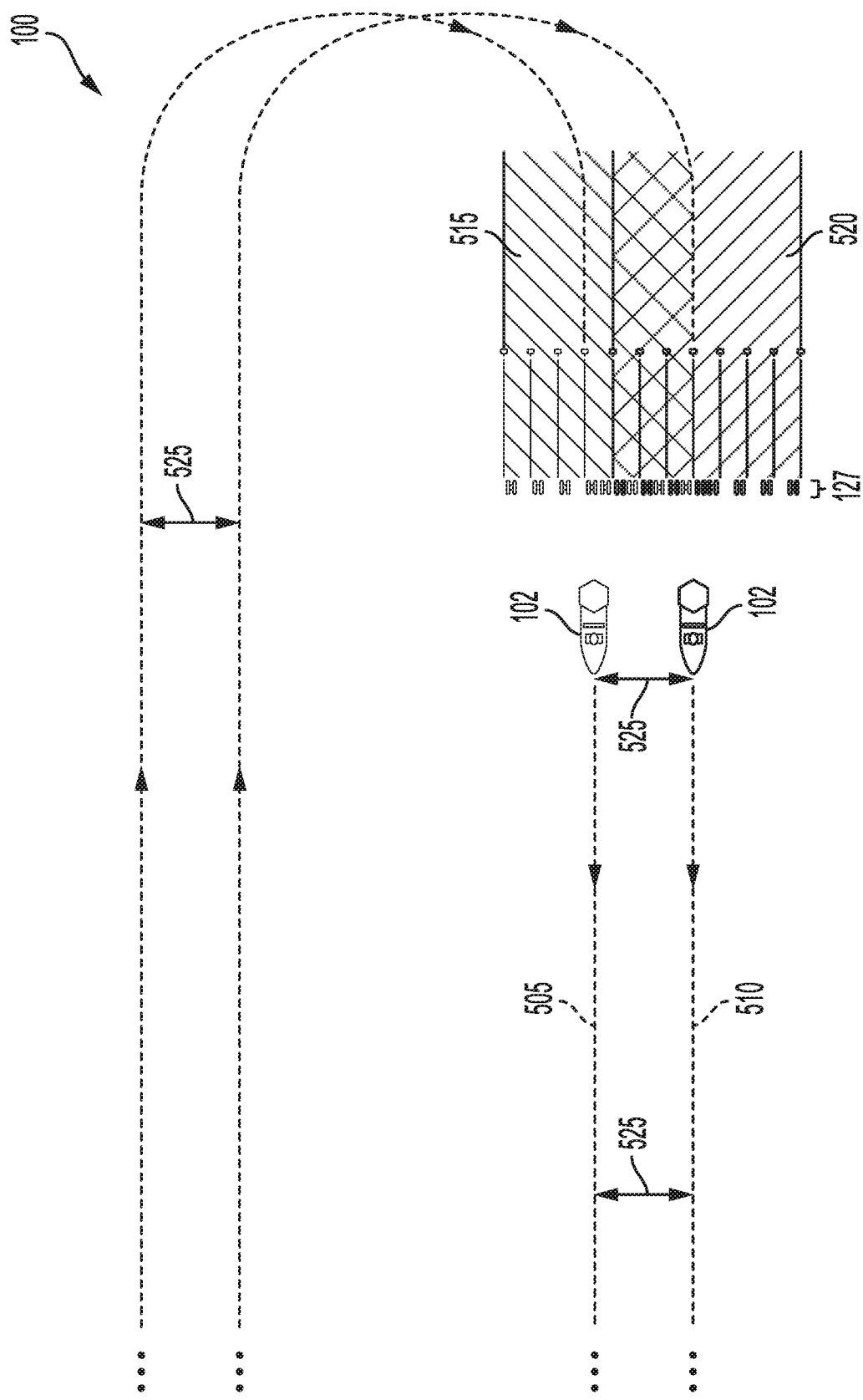
FIG. 5 illustrates a seabed object detection system according to an example implementation.

FIG. 5 illustrates a seabed object detection system 100. The seabed object detection system 100 can include the source array 127. The source array 127 can be towed as part of a first pass 505. For example, the source array 127 towed as part of the first pass 505 can define a first path 515. The vessel 102 can tow the source array 127 as part of the first pass 505. The source array 127 can be towed as part of a second pass 510. For example, the source array 127 towed as part of the second pass 510 can define a second path 520. The vessel 102 can tow the source array 127 as part of the first pass 505. The first path 515 can be interleaved with the second path 520. For example, the source array 127 towed during a first pass 505 can trace out the first path 515. The source array 127 towed during a second pass 510 can trace out the second path 520. The first path 515 and the second path 520 can overlap.

The seabed object detection system 100 perform a survey. The survey can include a first pass 505 and a second pass 510. The first pass 505 can proceed in a pattern (e.g., an elliptical pattern, an oval pattern, an obround pattern, a circular pattern). For example, the vessel 102 can tow the source array 127 as part of the first pass 505. The vessel 102 can tow the receiver array 105 as part of the first pass 505. The vessel 102 can tow the source array 127 as part of the second pass 510. The second pass 510 can proceed in a pattern (e.g., an elliptical pattern, an oval pattern, an obround pattern, a circular pattern). The vessel 102 can tow the receiver array 105 as part of the second pass 510. The first pass 505 can be a distance 525 from the second pass 510. The vessel 102 can tow the source array 127 as a part of the first pass 505 a distance 525 from the second pass 510. The vessel 102 can tow the receiver array 105 as part of the first pass 505 a distance 525 from the second pass 510.

The seabed object detection system 100 can include an offset 525 between the first path 515 and the second path 520. For example, the second source 155 during the first pass 505 can include an offset 525 from the second source 155 during the second pass 510. The first source 150 during the first pass 505 can include an offset 525 from the first source 150 during the second pass 510. The fourth source 165 during the first pass 505 can include an offset 525 from the fourth source 165 during the second pass 510. The third source 160 during the first pass 505 can include an offset 525 from the third source 160 during the second pass 510. For example, the second streamer 130 during the first pass 505 can include an offset 525 from the second streamer 130 during the second pass 510. The first streamer 125 during the first pass 505 can include an offset 525 from the first streamer 125 during the second pass 510. The fourth streamer 140 during the first pass 505 can include an offset 525 from the fourth streamer 140 during the second pass 510. The third streamer 135 during the first pass 505 can include an offset 525 from the third streamer 135 during the second pass 510. The vessel 102 during the first pass 505 can include an offset 525 from the vessel 102 during the second pass 510.

The seabed object detection system 100 can include a vessel 102 configured to tow the receiver array 105 and the source array 127. The vessel 102 can tow the receiver array 105 and the source array 127 during a first pass 505. The first pass 505 can proceed in a pattern (e.g., an elliptical pattern, an oval pattern, an obround pattern, a circular pattern). For example, the vessel 102 can tow the source array 127 as part of the first pass 505. The vessel 102 can tow the receiver array 105 as part of the first pass 505.

The vessel 102 can be configured to tow the receiver array 105 and the source array 127. The source array 127 can generate an acoustic signal. The first plurality of receivers 110 can receive diffraction data diffracted off an object in the seabed and generated by the source array 127. The second plurality of receivers 120 can receive diffraction data diffracted off an object in the seabed and generated by the source array 127. For example, the first source 150 can generate an acoustic signal. The first plurality of receivers 110 can receive diffraction data diffracted off an object in the seabed and generated by the first source 150. The second plurality of receivers 120 can receive diffraction data diffracted off an object in the seabed and generated by the first source 150. The second source 155 can generate an acoustic signal. The first plurality of receivers 110 can receive diffraction data diffracted off an object in the seabed and generated by the second source 155. The second plurality of receivers 120 can receive diffraction data diffracted off an object in the seabed and generated by the first source 150.

The vessel 102 can tow the receiver array 105 and the source array 127 during a second pass 510. The vessel 102 can tow the source array 127 as part of the second pass 510. The vessel 102 can tow the receiver array 105 as part of the second pass 510. The second pass 510 can proceed in a pattern (e.g., an elliptical pattern, an oval s, an obround pattern, a circular pattern). For example, the vessel 102 can tow the source array 127 as part of the second pass 510. The vessel 102 can tow the receiver array 105 as part of the second pass 510.

The vessel 102 during the first pass 505 can be located a distance 525 from the vessel 102 during the second pass 510. The distance 525 can be based on a number of streamers and a distance between the plurality of streamers 115. The distance 525 can be the number of plurality of streamers 115 times the distance between the plurality of streamers divided by two. For example, the number of streamers can be eight. The distance between two streamers of the plurality of streamers 115 can be 12.5 m. The distance between two streamers of the plurality of streamers 115 can be less than 12.5 m. The distance between two streamers of the plurality of streamers 115 can be greater than 12.5 m. Therefore the distance 525 can be 50 m. The number of streamers deployed can be an integer multiple of two. The number of streamers deployed can be equal to or greater than four. The number of sources deployed can be a multiple of the number of streamers deployed. The number of sources between the central pair of streamers can be a multiple of two. The number of sources between the first streamer 125 and the second streamer 130 can be a multiple of two.

The receiver array 105 towed during a first pass 505 can define a first path 515. The receiver array 105 towed during a second pass 510 can define a second path 520. The first path 515 can be interleaved with the second path 520 such that the first path 515 overlaps the second path 520. For example, the receiver array 105 towed during a first pass 505 can trace out a first path 515. The receiver array 105 towed during a second pass 510 can trace out a second path 520. The first path 515 can be defined by an area traced out by the receiver array 105 during the first pass 505. The second path 520 can be defined by an area traced out by the receiver array 105 during the second pass 510.

Figure 6:
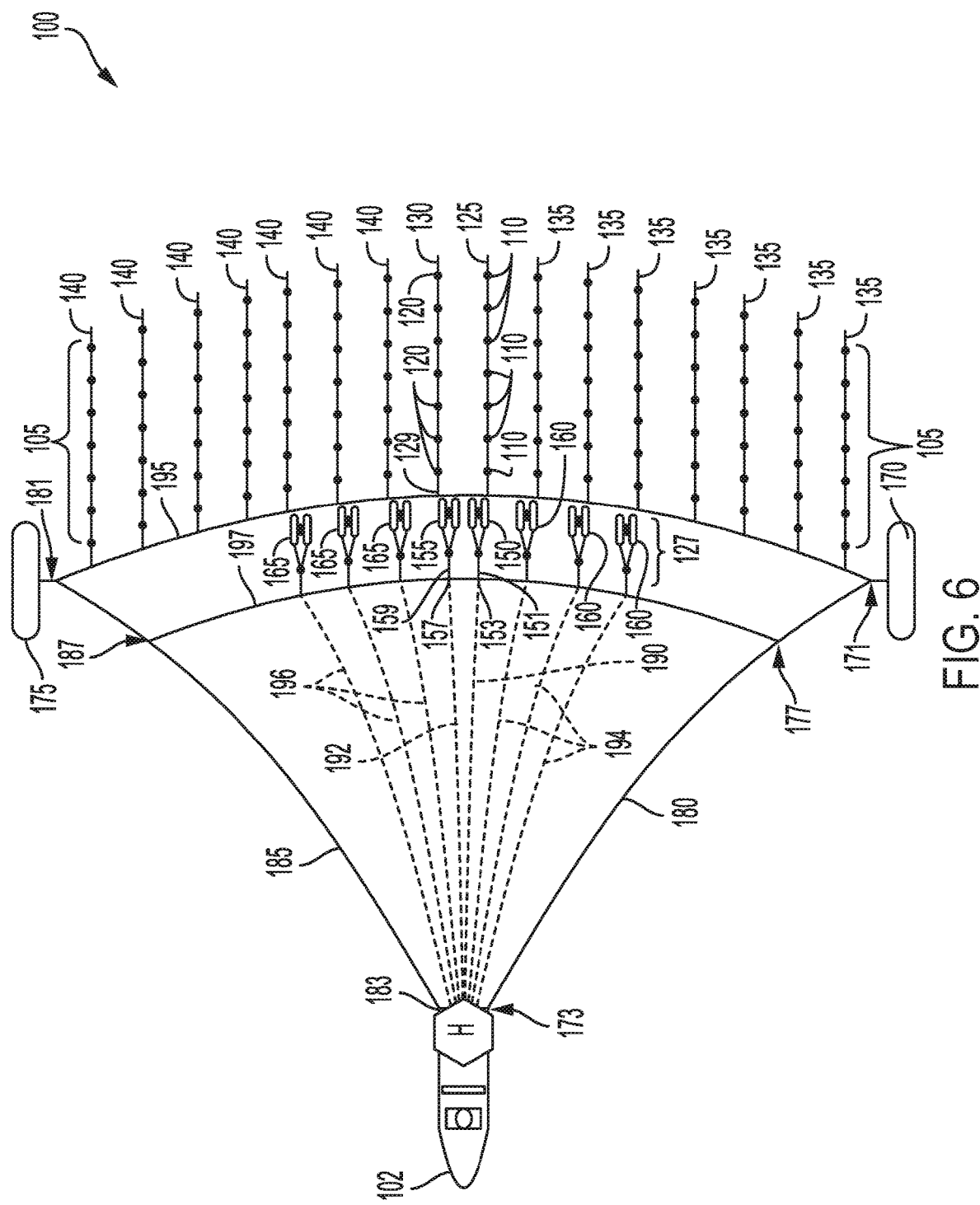
FIG. 6 illustrates a seabed object detection system according to an example implementation.

FIG. 6 illustrates a seabed object detection system 100. The seabed object detection system 100 can include a receiver array 105. The receiver array 105 can include a first streamer 125. The receiver array 105 can include a second streamer 130. For example, the first streamer 125 may be a cable (e.g., a surface marine cable), an assembly of wires, or any component capable of connecting a receiver to a recording device which may be located on a vessel 102. The first streamer 125 can couple to a receiver array cross-cable 195. The first streamer 125 can couple to the receiver array cross-cable 195 at a first streamer connection point 123. For example, the second streamer 130 may be a cable (e.g., a surface marine cable), an assembly of wires, or any component capable of connecting a receiver to a recording device which may be located on a vessel 102. The second streamer 130 can couple to the receiver array cross-cable 195. The second streamer 130 can couple to the receiver array cross-cable 195 at a second streamer connection point 129.

The first plurality of receivers 110 can be coupled with the first streamer 125. The first plurality of receivers 110 can be disposed on the first streamer 125. The first plurality of receivers 110 can be coupled to the first streamer 125 along a line. The first plurality of receivers 110 can be evenly spaced along the first streamer 125. The first plurality of receivers 110 can receive diffraction data diffracted off an object in a seabed. For example, a receiver of the first plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The first plurality of receivers 110 can be configured to detect acoustic waves that are reflected by seabed objects. The first plurality of receivers 110 can be configured to detect acoustic waves that are diffracted by seabed objects. The first plurality of receivers 110 can detect diffraction data from edges of objects. For example, the first plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the first plurality of receivers 110 can detect objects with facets, edges, sharp boundaries, or textures. The seabed objects can be completely buried within the seabed. The seabed objects can be partially buried within the seabed.

The second plurality of receivers 120 can be coupled with the second streamer 130. The second plurality of receivers 120 can be disposed on the second streamer 130. The second plurality of receivers 120 can be coupled to the second streamer 130 along a line. The second plurality of receivers 120 can be evenly spaced along the second streamer 130. The second plurality of receivers 120 can receive diffraction data diffracted off an object in a seabed. For example, a receiver of the second plurality of receivers 120 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The second plurality of receivers 120 can be configured to detect acoustic waves that are reflected by seabed objects. The second plurality of receivers 120 can be configured to detect acoustic waves that are diffracted by seabed objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The second plurality of receivers 120 can detect objects with irregular surface features. For example, second plurality of receivers 120 can detect objects with facets, edges, sharp boundaries, or textures. The seabed objects can be completely buried within the seabed. The seabed objects can be partially buried within the seabed.

The system 100 can include a receiver array cross-cable 195. The receiver array cross-cable 195 can couple with the first streamer 125 at the first streamer connection point 123. For example, the first streamer 125 can be tied to the receiver array cross-cable 195 at the first streamer connection point 123. The first streamer connection point 123 can be closer to a second diverter 175 than to a first diverter 170. The first streamer connection point 123 can be closer to the first diverter 170 than to the second diverter 175. The receiver array cross-cable 195 can couple with the first streamer 125 at a first end of the first streamer 125. The first streamer 125 can couple to the receiver array cross-cable 195 at multiple connections points. The receiver array cross-cable 195 can couple with the second streamer 130 at the second streamer connection point 129. For example, the second streamer 130 can be tied to the receiver array cross-cable 195 at the second streamer connection point 129. The second streamer connection point 129 can be closer to the first diverter 170 than to the second diverter 175. The second streamer connection point 129 can be closer to the second diverter 175 that to the first diverter 170. The receiver array cross-cable 195 can couple with the second streamer 130 at a first end of the second streamer 130. The second streamer 130 can couple to the receiver array cross-cable 195 at multiple connections points. The receiver array cross-cable 195 can couple with a source array cross-cable 197 at a first source array cross-cable connection point 177. The receiver array cross-cable 195 can couple with a first lateral cable 180. The receiver array cross-cable 195 can couple with the first lateral cable 180 at a first lateral cable distal end 171. The receiver array cross-cable 195 can couple with a first diverter 170. The receiver array cross-cable 195 can couple with the source array cross-cable 197 at a second source array cross-cable connection point 187. The receiver array cross-cable 195 can couple with a second diverter 175. The receiver array cross-cable 195 can couple with a second lateral cable 185. The receiver array cross-cable 195 can couple with the second lateral cable 185 at a second lateral cable distal end 181. The receiver array cross-cable 195 may be a power cable to transmit electrical power from the vessel 102 to the first plurality of receivers 110. The receiver array cross-cable 195 may be a power cable to transmit electrical power from the vessel 102 to the second plurality of receivers 120.

The seabed object detection system 100 can include a source array 127. The source array 127 can include a first source 150. For example, the first source 150 can generate a source shot. The first source 150 can generate acoustic waves. The source array 127 can generate an acoustic signal to be received by the receiver array 105. For example, the source array 127 can include the first source 150 coupled to a source array cross-cable 197. The source array 127 including the first source 150 can include a pattern of sources. The source array 127 can include a second source 155. For example, the second source 155 can generate a source shot. The second source 155 can generate acoustic waves. The source array 127 can generate an acoustic signal to be received by the receiver array 105. For example, the source array 127 can include the second source 155 coupled to the source array cross-cable 197. The source array 127 including the second source 155 can include a pattern of sources.

The seabed object detection system 100 can include a first source cable 151. The first source cable 151 can couple with the first source 150. For example, the first source cable 151 can split into two cables that both couple with the first source 150. The first source cable 151 can connect to the first source 150. The first source cable 151 can connect to the first source 150 through multiple cables. The first source cable 151 may be a cable (e.g., a surface marine cable), an assembly of wires, or any component capable of connecting a source to a power supple on the vessel 102. The first source cable 151 can couple with the first source 150 at a first end. The first source cable 151 may be a tether, rope, or chain. The first source cable 151 can be shorter than a source array cross-cable 197. The source array cross-cable 197 can be longer than the first source cable 151.

The seabed object detection system 100 can include a second source cable 159. The second source cable 159 can couple with the second source 155. For example, the second source cable 159 can split into two cables that both couple with the second source 155. The second source cable 159 can connect to the second source 155. The second source cable 159 can connect to the second source 155 through multiple cables. The second source cable 159 may be a cable (e.g., a surface marine cable), an assembly of wires, or any component capable of connecting a source to a power supple on the vessel 102. The second source cable 159 can couple with the second source 155 at a first end. The second source cable 159 may be a tether, rope, or chain. The second source cable 159 can be shorter than the source array cross-cable 197. The source array cross-cable 197 can be longer than the second source cable 159.

The seabed object detection system 100 can include a source array cross-cable 197. The source array cross-cable 197 can couple with the first source 150 at a first source attachment point 153. For example, the source array cross-cable 197 can couple with the first source 150 through a first source cable 151. The source array cross-cable 197 can couple with a second end of the first source cable 151. The source array cross-cable 197 can connect with the first source cable 151 to couple with the first source 150. The first source attachment point 153 can be multiple points of connection between the source array cross-cable 197 and the first source cable 151. The first source attachment point 153 can be multiple points of connection between the source array cross-cable 197 and the first source 150. The source array cross-cable 197 can couple with the second source 155 at a second source attachment point 157. For example, the source array cross-cable 197 can couple with the second source 155 through a second source cable 159. The source array cross-cable 197 can couple with a second end of the second source cable 159. The source array cross-cable 197 can connect with the second source cable 159 to couple with the second source 155. The second source attachment point 157 can be multiple points of connection between the source array cross-cable 197 and the second source cable 159. The second source attachment point 157 can be multiple points of connection between the source array cross-cable 197 and the second source 155. The source array cross-cable 197 may be a power cable to transmit electrical power from the vessel 102 to the first source 150. The source array cross-cable 197 may be a power cable to transmit electrical power from the vessel 102 to the second source 155.

The first source 150 can be closer to the first streamer 125 than to the first source attachment point 153. For example, the first source 150 can be more than halfway the distance from the first source attachment point 153 to the first streamer 125. The first source 150 can be closer to the second streamer 130 than to the second source attachment point 157. For example, the first source 150 can be more than halfway the distance from the second source attachment point 157 to the second streamer 130. The first source 150 can be closer to the third streamer 135 than to the first source attachment point 153. For example, the first source 150 can be more than halfway the distance from the first source attachment point 153 to the third streamer 135. The first source 150 can be closer to the first source attachment point 153 than to the third streamer 135. For example, the first source 150 can be more than halfway the distance from the third streamer 135 to the first source attachment point 153.

The second source 155 can be closer to the second streamer 130 than to the second source attachment point 157. For example, the second source 155 can be more than halfway the distance from the second source attachment point 157 to the second streamer 130. The second source 155 can be closer to the first streamer 125 than to the first source attachment point 153. For example, the second source 155 can be more than halfway the distance from the first source attachment point 153 to the first streamer 125. The second source 155 can be closer to the fourth streamer 140 than to the second source attachment point 157. For example, the second source 155 can be more than halfway the distance from the second source attachment point 157 to the fourth streamer 140. The second source 155 can be closer to the second source attachment point 157 than to the fourth streamer 140. For example, the second source 155 can be more than halfway the distance from the fourth streamer 140 to the second source attachment point 157.

The seabed object detection system 100 can include a first lateral cable 180 to couple with a first diverter 170. The first lateral cable 180 can couple with the source array cross-cable 197 at a first source array cross-cable connection point 177. For example, the first lateral cable 180 may be a cable (e.g., a surface marine cable), an assembly of wires, a tether, or a rope. The first lateral cable 180 can connect with the source array cross-cable 197 at the first source array cross-cable connection point 177. The first source array cross-cable connection point 177 can be closer to the first diverter 170 than a first lateral cable proximal end 173. The first source array cross-cable connection point 177 can be closer to a first lateral cable distal end 171 than the first lateral cable proximal end 173. The first lateral cable 180 can couple with the receiver array cross-cable 195. The receiver array cross-cable 195 can couple with the first diverter 170. The first lateral cable 180 can couple directly to the first diverter 170. The first lateral cable 180 can couple to the first diverter 170 through a secondary cable. The first lateral cable 180 can be coupled with the receiver array cross-cable 195 to connect with the first diverter 170. The first lateral cable 180 can be coupled with the receiver array cross-cable 195 to connect with the first diverter 170 at the first lateral cable distal end 171. The first lateral cable 180 may be a power cable to transmit electrical power from the vessel 102 to the first source 150. The first lateral cable 180 may be a power cable to transmit electrical power from the vessel 102 to the second source 155. The first lateral cable 180 may be a power cable to transmit electrical power from the vessel 102 to the first plurality of receivers 110. The first lateral cable 180 may be a power cable to transmit electrical power from the vessel 102 to the second plurality of receivers 120.

The first diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seabed object detection system 100 can include a second lateral cable 185 to couple with a second diverter 175. The second lateral cable 185 can couple with the source array cross-cable 197 at a second source array cross-cable connection point 187. For example, the second lateral cable 185 may be a cable (e.g., a surface marine cable), an assembly of wires, a tether, or a rope. The second lateral cable 185 can connect with the source array cross-cable 197 at the second source array cross-cable connection point 187. The second source array cross-cable connection point 187 can be closer to the second diverter 175 than a second lateral cable proximal end 183. The second source array cross-cable connection point 187 can be closer to a second lateral cable distal end 181 than the second lateral cable proximal end 183. The second lateral cable 185 can couple with the receiver array cross-cable 195. The receiver array cross-cable 195 can couple with the second diverter 175. The second lateral cable 185 can couple directly to the second diverter 175. The second lateral cable 185 can couple to the second diverter 175 through a secondary cable. The second lateral cable 185 can be coupled with the receiver array cross-cable 195 to connect with the second diverter 175. The second lateral cable 185 can be coupled with the receiver array cross-cable 195 to connect with the second diverter 175 at the second lateral cable distal end 181. The second lateral cable 185 may be a power cable to transmit electrical power from the vessel 102 to the first source 150. The second lateral cable 185 may be a power cable to transmit electrical power from the vessel 102 to the second source 155. The second lateral cable 185 may be a power cable to transmit electrical power from the vessel 102 to the first plurality of receivers 110. The second lateral cable 185 may be a power cable to transmit electrical power from the vessel 102 to the second plurality of receivers 120.

The second diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The second diverter 175 can be connected by a cable to the first diverter 170. For example, the second diverter 175 can be connected by a receiver array cross-cable 195 to the first diverter 170.

The seabed object detection system 100 can include a vessel 102. The vessel 102 can tow the receiver array 105. The vessel 102 can tow the source array 127. The vessel 102 can tow the source array 127 in a tow direction 101. The vessel 102 can tow the receiver array 105 in a tow direction 101. The vessel can tow the source array cross-cable 197 ahead of the receiver array cross-cable 195 relative to the tow direction 101. For example, the vessel 102 can tow the source array cross-cable 197 in the tow direction 101. The vessel 102 can tow the receiver array cross-cable 195 in the tow direction 101. A portion of the source array cross-cable 197 can be ahead of a portion of the receiver array cross-cable 195 relative to the tow direction 101. The vessel 102 can be coupled to the first lateral cable 180. The vessel 102 can be coupled to the first lateral cable 180 at a first lateral cable proximal end 173. The vessel 102 can be coupled to the second lateral cable 185. The vessel 102 can be coupled to the second lateral cable 185 at a second lateral cable proximal end 183.

The seabed object detection system 100 can include a third streamer 135. The third streamer 135 can be located a first distance from the first streamer 125. The third streamer 135 can be located a first distance from the second streamer 130. The first distance can include distances between 5 meters and 30 meters. For example, the first distance can be 12.5 meters. The first distance can be less than 5 meters. The first distance can be greater than 30 meters. The third streamer 135 may be a cable (e.g., a surface marine cable), an assembly of wires, or any component capable of connecting a receiver to a recording device which may be located on the vessel 102. The receiver array 105 can include the third streamer 135. The receiver array 105 can include multiple third streamers 135. For example, the receiver array 105 can include one, two, three, or more third streamers 135.

The seabed object detection system 100 can include a fourth streamer 140. The fourth streamer 140 can be located a first distance from the first streamer 125. The fourth streamer 140 can be located a first distance from the second streamer 130. The first distance can include distances between 5 meters and 30 meters. For example, the first distance can be 12.5 meters. The first distance can be less than 5 meters. The first distance can be greater than 30 meters. The fourth streamer 140 may be a cable (e.g., a surface marine cable), an assembly of wires, or any component capable of connecting a receiver to a recording device which may be located on the vessel 102. The receiver array 105 can include the fourth streamer 140. The receiver array 105 can include multiple fourth streamers 140. For example, the receiver array 105 can include one, two, three, or more fourth streamers 140.

The seabed object detection system 100 can include a third source 160. The source array 127 can include a third source 160. The third source 160 can be located between the first streamer 125 and the third streamer 135. The third source 160 can be located between a first third streamer 135 and a second third streamer 135. The third source 160 can generate acoustic waves to be reflected off a seabed object and received by the first plurality of receivers 110. The third source 160 can generate acoustic waves to be diffracted off a seabed object and received by the first plurality of receivers 110. The source array 127 can include multiple third sources 160. For example, the source array 127 can include one, two, three, or more third sources 160. The third source 160 can generate acoustic waves to be reflected off a seabed object and received by the second plurality of receivers 120. The third source 160 can generate acoustic waves to be diffracted off a seabed object and received by the second plurality of receivers 120.

The seabed object detection system 100 can include a fourth source 165. The source array 127 can include a fourth source 165. The fourth source 165 can be located between the second streamer 130 and the fourth streamer 140. The fourth source 165 can be located between a first fourth streamer 140 and a second fourth streamer 140. The fourth source 165 can generate acoustic waves to be reflected off a seabed object and received by the first plurality of receivers 110. The fourth source 165 can generate acoustic waves to be diffracted off a seabed object and received by the first plurality of receivers 110. The source array 127 can include multiple fourth sources 165. For example, the source array 127 can include one, two, three, or more fourth sources 165. The fourth source 165 can generate acoustic waves to be reflected off a seabed object and received by the second plurality of receivers 120. The fourth source 165 can generate acoustic waves to be diffracted off a seabed object and received by the second plurality of receivers 120.

The seabed object detection system 100 can include a plurality of streamers. The plurality of streamers can include the first streamer 125. The plurality of streamers can include the second streamer 130. The plurality of streamers can include one or more third streamers 135. For example, the plurality of streamers can include three third streamers 135. The plurality of streamers can include one or more fourth streamers 140. For example, the plurality of streamers can include three fourth streamers 140. The plurality of streamers can include exactly eight streamers. A plurality of receivers can be disposed on the third streamer 135. A plurality of receivers can be disposed on the fourth streamer 140. The plurality of streamers can include one, two, three, four, five, six, seven, or more third streamers 135. A plurality of receivers can be disposed on the one, two, three, four, five, six, seven, or more third streamers 135. The plurality of streamers can include one, two, three, four, five, six, seven, or more fourth streamers 140. A plurality of receivers can be disposed on the one, two, three, four, five, six, seven, or more fourth streamers 140. The plurality of streamers can be distributed over the entire span of the receiver array cross-cable 195. The plurality of streamers can be evenly distributed over the entire span of the receiver array cross-cable 195.

The seabed object detection system 100 can include a plurality of sources. The plurality of sources can include the first source 150. The plurality of sources can include the second source 155. The plurality of sources can include one or more third sources 160. For example, the plurality of sources can include three third sources 160. The plurality of sources can include one or more fourth sources 165. For example, the plurality of sources can include three fourth sources 165. The plurality of sources can include exactly eight sources. The plurality of sources can generate an acoustic signal. The first plurality of receivers 110 can receive reflection data reflection off an object in the seabed 220. The second plurality of receivers 120 can receive reflection data reflected off an object in the seabed 220. The first source 150 can generate an acoustic signal. The first plurality of receivers 110 can receive reflection data reflection off an object in the seabed 220 and generated by the first source 150. The second plurality of receivers 120 can receive reflection data reflected off an object in the seabed 220 and generated by the first source 150. The second source 155 can generate an acoustic signal. The first plurality of receivers 110 can receive reflection data reflection off an object in the seabed 220 and generated by the second source 155. The second plurality of receivers 120 can receive reflection data reflected off an object in the seabed 220 and generated by the second source 155.

The seabed object detection system 100 can include additional cables. For example, the system 100 can include a third power cable 194. The third power cable 194 can transmit electrical power from the vessel 102 to the third source 160. The system 100 can include multiple third power cables 194. For example, the vessel 102 can transmit electrical power through one, two, three, or more third power cables 194 to one, two, three, or more third sources 160. The system 100 can include a fourth power cable 196. The fourth power cable 196 can transmit electrical power from the vessel 102 to the fourth source 165. For example, the vessel 102 can transmit electrical power through one, two, three, or more fourth power cables 196 to one, two, three, or more fourth sources 165.

Figure 7:
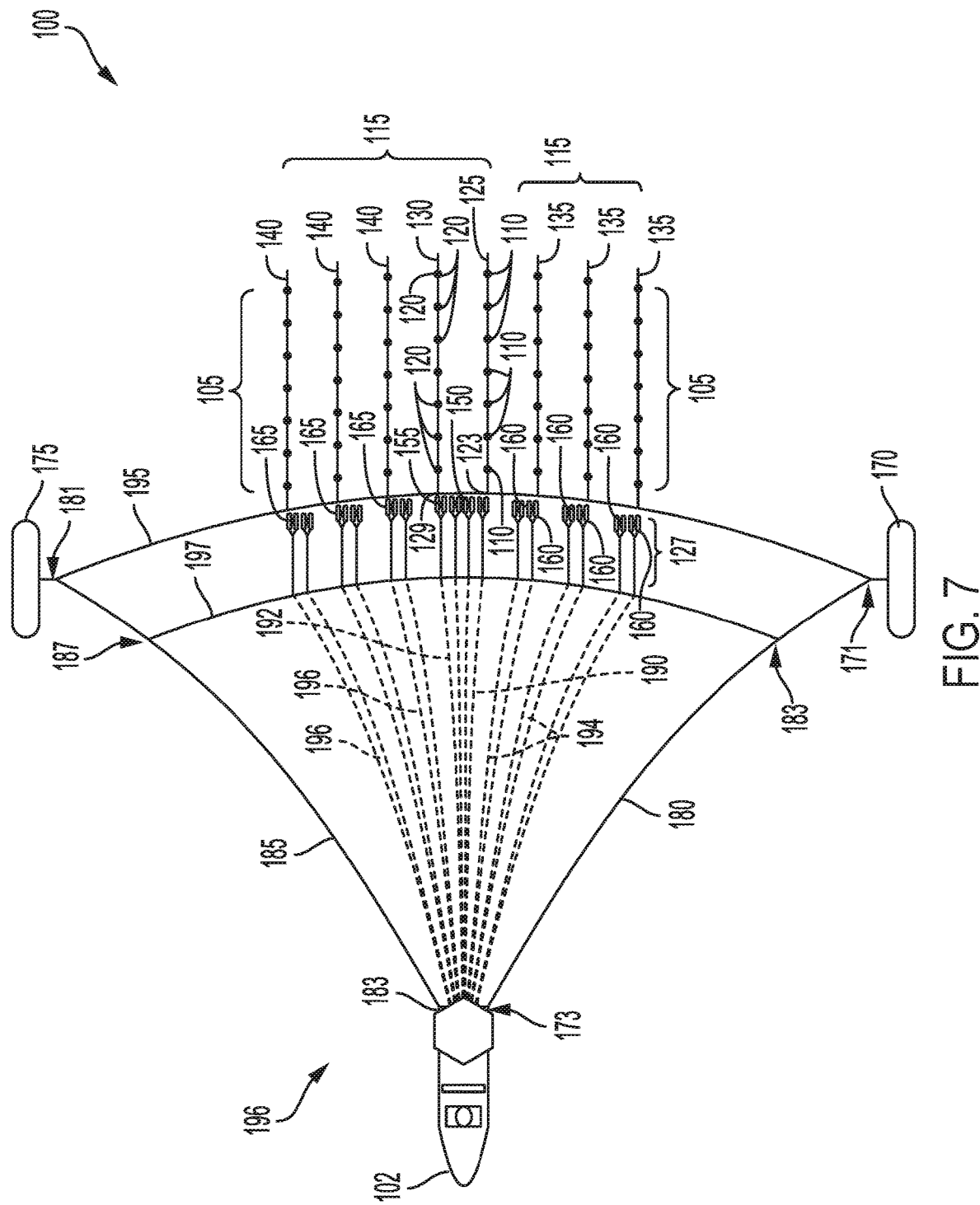
FIG. 7 illustrates a seabed object detection system according to an example implementation.

FIG. 7 illustrates a seabed object detection system 100. The seabed object detection system 100 can include a source array 127. The source array 127 can include a first source 150. For example, the first source 150 can generate a source shot. The first source 150 can generate acoustic waves. The source array 127 can generate an acoustic signal to be received by the receiver array 105. For example, the source array 127 can include the first source 150 coupled to a source array cross-cable 197. The source array 127 including the first source 150 can include a pattern of sources. The source array 127 can include a second source 155. For example, the second source 155 can generate a source shot. The second source 155 can generate acoustic waves. The source array 127 can generate an acoustic signal to be received by the receiver array 105. For example, the source array 127 can include the second source 155 coupled to the source array cross-cable 197. The source array 127 including the second source 155 can include a pattern of sources. The source array 127 can include sixteen sources. For example, the source array 127 can include a first source 150 including two sources, a second source 155 including two sources, three third sources 160 including two sources, and three fourth sources 165 including two sources.

The seabed object detection system 100 can include a first source cable 151. The first source cable 151 can couple with the first source 150. For example, the first source cable 151 can split into two cables that both couple with the first source 150. The first source cable 151 can connect to the first source 150. The first source cable 151 can connect to the first source 150 through multiple cables. The first source cable 151 may be a cable (e.g., a surface marine cable), an assembly of wires, or any component capable of connecting a source to a power supple on the vessel 102. The first source cable 151 can couple with the first source 150 at a first end. The first source cable 151 may be a tether, rope, or chain. The first source cable 151 can be shorter than a source array cross-cable 197. The source array cross-cable 197 can be longer than the first source cable 151. The first source cable 151 can include a pair of cables.

The seabed object detection system 100 can include a second source cable 159. The second source cable 159 can couple with the second source 155. For example, the second source cable 159 can split into two cables that both couple with the second source 155. The second source cable 159 can connect to the second source 155. The second source cable 159 can connect to the second source 155 through multiple cables. The second source cable 159 may be a cable (e.g., a surface marine cable), an assembly of wires, or any component capable of connecting a source to a power supple on the vessel 102. The second source cable 159 can couple with the second source 155 at a first end. The second source cable 159 may be a tether, rope, or chain. The second source cable 159 can be shorter than the source array cross-cable 197. The source array cross-cable 197 can be longer than the second source cable 159. The second source cable 159 can include a pair of cables.

The seabed object detection system 100 can include a first power cable 190 to provide power to the first source 150. For example, the first power cable 190 may be a power cable to transmit electrical power from the vessel 102 to the first source 150. The first power cable 190 may be a power cable to transmit electrical power from the source array cross-cable 197 to the first source 150. The first power cable 190 may be multiple power cables. The first power cable 190 may connect to the source array cross-cable 197 at a first source attachment point 153. The first power cable 190 can transmit electrical power from the vessel 102 to two sources of the first source 150. The first power cable 190 can include a pair of power cables.

The seabed object detection system 100 can include a second power cable 192 to provide power to the second source 155. For example, the second power cable 192 may be a power cable to transmit electrical power from the vessel 102 to the second source 155. The second power cable 192 may be a power cable to transmit electrical power from the source array cross-cable 197 to the second source 155. The second power cable 192 may be multiple power cables. The second power cable 192 may connect to the source array cross-cable 197 at a second source attachment point 157. The second power cable 192 can transmit electrical power from the vessel 102 to two sources of the second source 155. The second power cable 192 can include a pair of power cables.

The seabed object detection system 100 can include additional cables. For example, the system 100 can include a third power cable 194. The third power cable 194 can transmit electrical power from the vessel 102 to the third source 160. The third power cable 194 can include a pair of power cables. The system 100 can include multiple third power cables 194. For example, the vessel 102 can transmit electrical power through one, two, three, or more third power cables 194 to one, two, three, or more third sources 160. The system 100 can include a fourth power cable 196. The fourth power cable 196 can transmit electrical power from the vessel 102 to the fourth source 165. The fourth power cable 196 can include a pair of power cables. For example, the vessel 102 can transmit electrical power through one, two, three, or more fourth power cables 196 to one, two, three, or more fourth sources 165.

Figure 8:
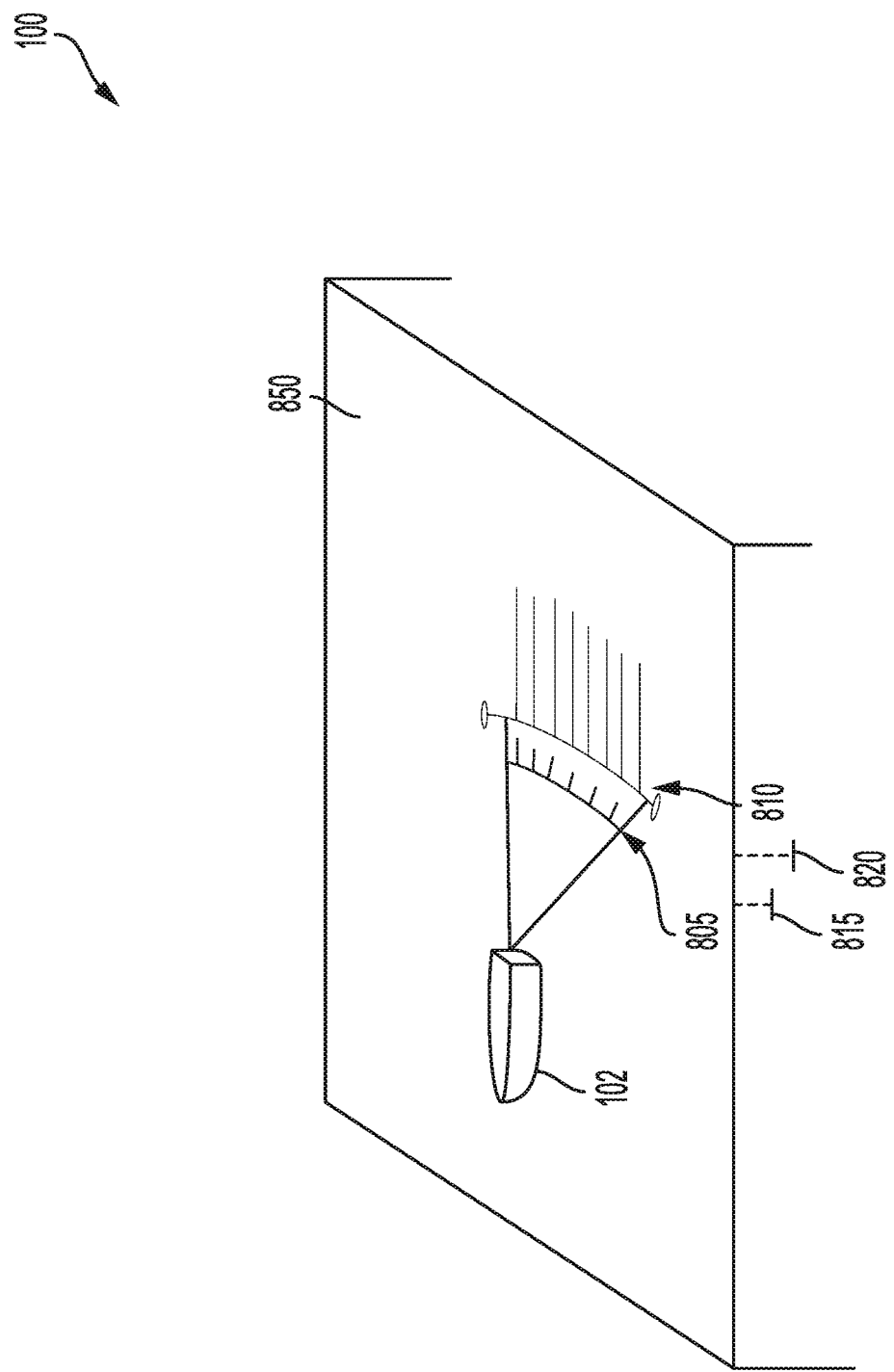
FIG. 8 illustrates a seabed object detection system according to an example implementation.

FIG. 8 illustrates a seabed object detection system 100. The seabed object detection system 100 can include a plane of the source array 805 disposed at a first depth 815 of a body of water 850. For example, the plane of the source array 805 can include the plane defined by the source array 127. The plane of the source array 805 can include a plane defined by the source array cross-cable 197. The plane of the source array 805 can include a plane defined by the first source 150. The plane of the source array 805 can include a plane defined by the second source 155. The plane of the source array 805 can include a plane defined by the third source 160. The plane of the source array 805 can include a plane defined by the fourth source 165. The first depth 815 can be a range of depths. For example, the first depth 815 can be between 15 meters and 50 meters (e.g., 15 meters, 20 meters, 25 meters, 30 meters, 35 meters, 40 meters, 45 meters, 50 meters). The first depth 815 can be less than 15 meters. The first depth 815 can be greater than 50 meters.

The seabed object detection system 100 can include a plane of the receiver array 810 disposed at a second depth 820 of the body of water 850. The plane of the receiver array 810 can include a plane defined by the receiver array 105. The plane of the receiver array 810 can include a plane defined by the first streamer 125. The plane of the receiver array 810 can include a plane defined by the second streamer 130. The plane of the receiver array 810 can include a plane defined by the third streamer 135. The plane of the receiver array 810 can include a plane defined by the fourth streamer 140. The plane of the receiver array 810 can include a plane defined by the receiver array cross-cable 195. The second depth 820 can be a range of depths. For example, the second depth 820 can be between 15 meters and 50 meters (e.g., 15 meters, 20 meters, 25 meters, 30 meters, 35 meters, 40 meters, 45 meters, 50 meters). The second depth 820 can be less than 15 meters. The second depth 820 can be greater than 50 meters.

Figure 9:
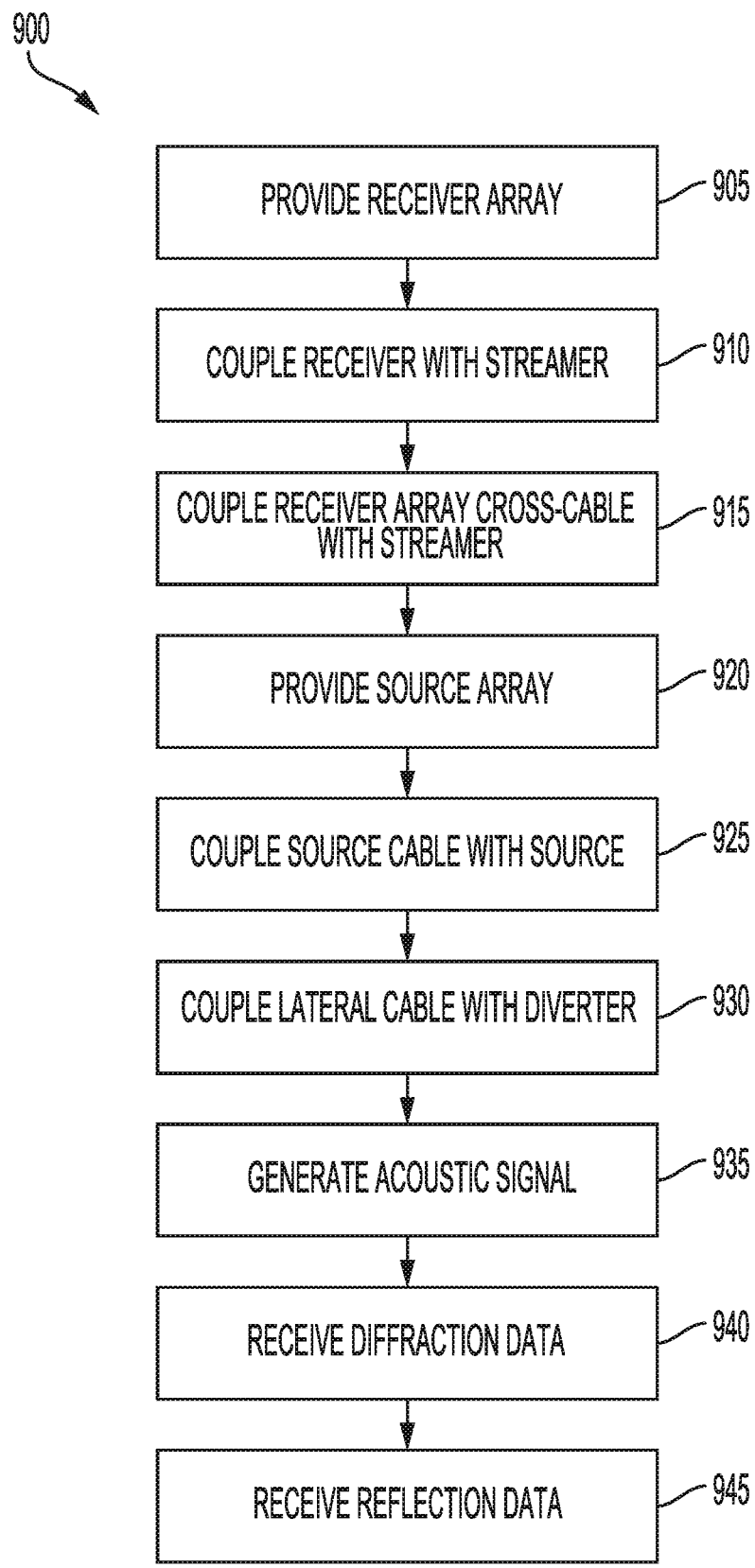
FIG. 9 illustrates a method of seabed object detection according to an example implementation.

FIG. 9 illustrates a method of seabed object detection according to an embodiment. In brief summary, the method 900 can include providing a receiver array (BLOCK 905). The method 900 can include coupling a receiver with a streamer (BLOCK 910). The method 900 can include coupling a receiver array cross-cable with a streamer (BLOCK 915). The method 900 can include providing a source array (BLOCK 920). The method 900 can include coupling a source cable with a source (BLOCK 925). The method 900 can include coupling a lateral cable with a diverter (BLOCK 930). The method 900 can include generating an acoustic signal (BLOCK 935). The method 900 can include receiving diffraction data (BLOCK 940). The method 900 can include receiving reflection data (BLOCK 945).

The method 900 can include providing a receiver array (BLOCK 905). The method can include providing a receiver array including a first streamer. The method can include providing a receiver array including a second streamer. The method can include towing, by a vessel, the receiver array. The method can include towing, by a vessel, the receiver array in a tow direction. The method can include disposing a plane of the receiver array at a second depth of the body of water. The method can include providing a plurality of streamers. The plurality of streamers can include the first streamer. The plurality of streamers can include the second streamer. The plurality of streamers can include exactly eight streamers.

The method 900 can include coupling a receiver with a streamer (BLOCK 910). The method can include coupling a first plurality of receivers with a first streamer. The method can include coupling a second plurality of receivers with the second streamer.

The method 900 can include coupling a receiver array cross-cable with a streamer (BLOCK 915). The method can include coupling a receiver array cross-cable with the first streamer. The method can include coupling a receiver array cross-cable with the first streamer at a first streamer connection point. The method can include coupling a receiver array cross-cable with the second streamer. The method can include coupling a receiver array cross-cable with the second streamer at a second streamer connection point.

The method 900 can include providing a source array (BLOCK 920). The method can include providing a source array including a first source. The method can include providing a source array including a second source. The method can include towing, by a vessel, the source array. The method can include towing, by a vessel, the source array in a tow direction. The method can include disposing a plane of the source array at a first depth of a body of water. The second depth can be deeper than the first depth. The method can include providing a plurality of sources. The plurality of sources can include the first source. The plurality of sources can include the second source. The plurality of sources can include exactly eight sources.

The method 900 can include coupling a source cable with a source (BLOCK 925). The method can include coupling a first source cable with the first source. The method can include coupling a second source cable with the second source. The method can include coupling a source array cross-cable with the first source cable. The method can include coupling a source array cross-cable with the first source cable at a first source attachment point. The method can include coupling a source array cross-cable with the second source cable. The method can include coupling a source array cross-cable with the second source cable at a second source attachment point. The method can include towing, by the vessel, the source array cross-cable ahead of the receiver array cross-cable. The method can include towing, by the vessel, the source array cross-cable ahead of the receiver array cross-cable relative to the tow direction. The method can include disposing the first source closer to the first streamer than to the first source attachment point. The method can include disposing the second source closer to the second streamer than to the second source attachment point.

The method 900 can include coupling a lateral cable with a diverter (BLOCK 930). The method can include coupling a first lateral cable with a first diverter. The first lateral cable can couple with the source array cross-cable. The first lateral cable can couple with the source array cross-cable at a first source array cross-cable connection point. The first source array cross-cable connection point can be closer to the first diverter than a first lateral cable proximal end. The method can include coupling a second lateral cable with a second diverter. The second lateral cable can couple with the source array cross-cable. The second lateral cable can couple with the source array cross-cable at a second source array cross-cable connection point. The second source array cross-cable connection point can be closer to the second diverter than a second lateral cable proximal end.

The method 900 can include generating an acoustic signal (BLOCK 935). The method can include generating, by the source array, an acoustic signal. The method can include generating, by the first source, an acoustic signal. The method can include generating, by the second source, an acoustic signal.

The method 900 can include receiving diffraction data (BLOCK 940). The method can include receiving, by the first plurality of receivers, diffraction data. The method can include receiving, by the first plurality of receivers, diffraction data diffracted off an object in a seabed. The method can include receiving, by the second plurality of receivers, diffraction data. The method can include receiving, by the second plurality of receivers, diffraction data diffracted off an object in a seabed.

The method 900 can include receiving reflection data (BLOCK 945). The method can include receiving, by the first plurality of receivers, reflection data. The method can include receiving, by the first plurality of receivers, reflection data reflected off an object in a seabed. The method can include receiving, by the second plurality of receivers, reflection data. The method can include receiving, by the second plurality of receivers, reflection data reflected off an object in a seabed.

Figure 10:
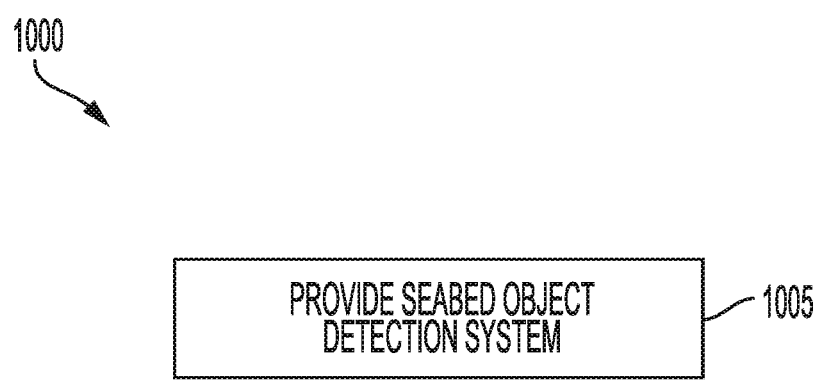
FIG. 10 illustrates a method of seabed object detection according to an example implementation.

FIG. 10 illustrates a method of seabed object detection according to an embodiment. The method 1000 can include providing a seabed object detection system (BLOCK 1005). The seabed object detection system can include a receiver array. The receiver array can include a first streamer. The receiver array can include a second streamer. The seabed object detection system can include a first plurality of receivers coupled with the first streamer. The seabed object detection system can include a second plurality of receivers coupled with the second streamer. The seabed object detection system can include a receiver array cross-cable to couple with the first streamer at a first streamer connection point and to couple with the second streamer at a second streamer connection point. The seabed object detection system can include a source array comprising a first source and a second source. The seabed object detection system can include a first source cable coupled with the first source. The seabed object detection system can include a second source cable coupled with the second source. The seabed object detection system can include a source array cross-cable to couple with the first source cable at a first source attachment point and to couple with the second source cable at a second source attachment point. The seabed object detection system can include a first lateral cable to couple with a first diverter. The first lateral cable can couple with the source array cross-cable at a first source array cross-cable connection point. The first source array cross-cable connection point can be closer to the first diverter than a first lateral cable proximal end. The seabed object detection system can include a second lateral cable to couple with a second diverter. The second lateral cable can couple with the source array cross-cable at a second source array cross-cable connection point. The second source array cross-cable connection point can be closer to the second diverter than a second lateral cable proximal end.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seabed object detection system, comprising:
a receiver array comprising a first streamer and a second streamer;
a first plurality of receivers coupled with the first streamer;
a second plurality of receivers coupled with the second streamer;
a receiver array cross-cable to couple with the first streamer at a first streamer connection point and to couple with the second streamer at a second streamer connection point;
a source array comprising a first source and a second source, wherein the source array comprises a pattern of sources;
a first source cable coupled with the first source;
a second source cable coupled with the second source;
a source array cross-cable to couple with the first source cable at a first source attachment point and to couple with the second source cable at a second source attachment point;
a first lateral cable to couple with a first diverter, wherein the first lateral cable is coupled to the source array cross-cable and the receiver array cross-cable,
a specific point of the first lateral cable is coupled to the source array cross-cable at a first source array cross-cable connection point,
a first lateral cable distal end of the first lateral cable is coupled to the receiver array cross-cable,
the specific point of the first lateral cable is different from the first lateral cable distal end of the first lateral cable,
the first lateral cable is coupled to the first diverter via the receiver array cross-cable, and
the first source array cross-cable connection point is between a first lateral cable proximal end of the first lateral cable and the first diverter via the receiver array cross-cable, the first source array cross-cable connection point is closer to the first diverter than the first lateral cable proximal end; and
a second lateral cable to couple with a second diverter, wherein
the second lateral cable is coupled to the source array cross-cable and the receiver array cross-cable,
a specific point of the second lateral cable is coupled to the source array cross-cable at a second source array cross-cable connection point,
a second lateral cable distal end of the second lateral cable is coupled to the receiver array cross-cable,
the specific point of the second lateral cable is different from the second lateral cable distal end of the second lateral cable,
the second lateral cable is coupled to the second diverter via the receiver array cross-cable,
the second source array cross-cable connection point is between a second lateral cable proximal end of the second lateral cable and the second diverter via the receiver array cross-cable, the second source array cross-cable connection point is closer to the second diverter than the second lateral cable proximal end, and
wherein the first source cable is shorter than the source array cross-cable and the second source cable is shorter than the source array cross-cable.

2. The seabed object detection system of claim 1, comprising:
a plane of the source array disposed at a first depth of a body of water; and
a plane of the receiver array disposed at a second depth of the body of water, the second depth deeper than the first depth.

3. The seabed object detection system of claim 1, comprising:
a vessel to tow the source array and the receiver array in a tow direction, the vessel to tow the source array cross-cable ahead of the receiver array cross-cable relative to the tow direction.

4. The seabed object detection system of claim 1, comprising:
the receiver array to receive diffraction data that includes diffracted waves originating from a seabed object and generated from a source shot.

5. The seabed object detection system of claim 1, comprising:
at least one receiver of the first plurality of receivers disposed beyond a critical angle of reflection for at least one source of the source array, the at least one receiver to receive diffraction data responsive to an acoustic source.

6. The seabed object detection system of claim 1, comprising:
a plurality of streamers, the plurality of streamers including the first streamer and the second streamer and the plurality of streamers comprises exactly eight streamers; and
a plurality of sources, the plurality of sources including the first source and the second source and the plurality of sources comprises exactly eight sources.

7. The seabed object detection system of claim 1, comprising:
the first source closer to the first streamer than to the first source attachment point; and
the second source closer to the second streamer than to the second source attachment point.

8. The seabed object detection system of claim 1, comprising:
a first power cable to provide power to the first source; and
a second power cable to provide power to the second source.

9. The seabed object detection system of claim 1, comprising:
the first lateral cable to couple with a vessel at the first lateral cable proximal end;
the second lateral cable to couple with the vessel at the second lateral cable proximal end.

10. The seabed object detection system of claim 1, comprising:
the receiver array towed during a first pass defines a first path and the receiver array towed during a second pass defines a second path, the first path interleaved with the second path such that the first path partially overlaps the second path.

11. The seabed object detection system of claim 1, comprising:
a vessel configured to tow the receiver array and the source array, the source array to generate an acoustic signal and the first plurality of receivers and the second plurality of receivers to receive diffraction data diffracted off an object in a seabed.

12. The seabed object detection system of claim 1, comprising:
a plurality of sources, the plurality of sources including the first source and the second source, the plurality of sources to generate an acoustic signal;
the first plurality of receivers and the second plurality of receivers to receive reflection data reflected off an object in a seabed.

13. A method of seabed object detection, comprising:
providing a receiver array comprising a first streamer and a second streamer;
coupling a first plurality of receivers with the first streamer;
coupling a second plurality of receivers with the second streamer;
coupling a receiver array cross-cable with the first streamer at a first streamer connection point;
coupling the receiver array cross-cable with the second streamer at a second streamer connection point;
providing a source array comprising a first source and a second source, wherein the source array comprises a pattern of sources;
coupling a first source cable with the first source;
coupling a second source cable with the second source;
coupling a source array cross-cable with the first source cable at a first source attachment point;
coupling the source array cross-cable with the second source cable at a second source attachment point;
coupling a first lateral cable with a first diverter, wherein the first lateral cable is coupled to the source array cross-cable and the receiver array cross-cable,
a specific point of the first lateral cable is coupled to the source array cross-cable at a first source array cross-cable connection point,
a first lateral cable distal end of the first lateral cable is coupled to the receiver array cross-cable,
the specific point of the first lateral cable is different from the first lateral cable distal end of the first lateral cable,
the first lateral cable is coupled to the first diverter via the receiver array cross-cable, and
the first source array cross-cable connection point is between a first lateral cable proximal end of the first lateral cable and the first diverter via the receiver array cross-cable, the first source array cross-cable connection point is closer to the first diverter than the first lateral cable proximal end; and
coupling a second lateral cable with a second diverter, wherein the second lateral cable is coupled to the source array cross-cable and the receiver array cross-cable,
a specific point of the second lateral cable is coupled to the source array cross-cable at a second source array cross-cable connection point,
a second lateral cable distal end of the second lateral cable is coupled to the receiver array cross-cable,
the specific point of the second lateral cable is different from the second lateral cable distal end of the second lateral cable,
the second lateral cable is coupled to the second diverter via the receiver array cross-cable,
the second source array cross-cable connection point is between a second lateral cable proximal end of the second lateral cable and the second diverter via the receiver array cross-cable, the second source array cross-cable connection point is closer to the second diverter than the second lateral cable proximal end, and
wherein the first source cable is shorter than the source array cross-cable and the second source cable is shorter than the source array cross-cable.

14. The method of claim 13, comprising:
towing, by a vessel, the source array and the receiver array in a tow direction; and
towing, by the vessel, the source array cross-cable ahead of the receiver array cross-cable relative to the tow direction.

15. The method of claim 13, comprising:
disposing a plane of the source array at a first depth of a body of water; and
disposing a plane of the receiver array a second depth of the body of water, the second depth deeper than the first depth.

16. The method of claim 13, comprising:
providing a plurality of streamers, the plurality of streamers including the first streamer and the second streamer and the plurality of streamers comprises exactly eight streamers;
providing a plurality of sources, the plurality of sources including the first source and the second source and the plurality of sources comprises exactly eight sources.

17. The method of claim 13, comprising:
towing, by a vessel, the receiver array and the source array;
generating, by the source array, an acoustic signal; and
receiving, by the first plurality of receivers, diffraction data diffracted off an object in a seabed.

18. The method of claim 13, comprising:
generating, by the first source, an acoustic signal;
receiving, by the first plurality of receivers, reflection data reflected off an object in a seabed.

19. A method of seabed object detection, comprising:
providing a seabed object detection system, the seabed object detection system comprising:
a receiver array comprising a first streamer and a second streamer;
a first plurality of receivers coupled with the first streamer;
a second plurality of receivers coupled with the second streamer;
a receiver array cross-cable to couple with the first streamer at a first streamer connection point and to couple with the second streamer at a second streamer connection point;
a source array comprising a first source and a second source, wherein the source array comprises a pattern of sources;
a first source cable coupled with the first source;
a second source cable coupled with the second source;

a source array cross-cable to couple with the first source cable at a first source attachment point and to couple with the second source cable at a second source attachment point;

a first lateral cable to couple with a first diverter, wherein the first lateral cable is coupled to the source array cross-cable and the receiver array cross-cable, a specific point of the first lateral cable is coupled to the source array cross-cable at a first source array cross-cable connection point, a first lateral cable distal end of the first lateral cable is coupled to the receiver array cross-cable, the specific point of the first lateral cable is different from the first lateral cable distal end of the first lateral cable, the first lateral cable is coupled to the first diverter via the receiver array cross-cable, and the first source array cross-cable connection point is between a first lateral cable proximal end of the first lateral cable and the first diverter, the first source array cross-cable connection point is closer to the first diverter than the first lateral cable proximal end; and a second lateral cable to couple with a second diverter, wherein the second lateral cable is coupled to the source array cross-cable and the receiver array cross-cable, a specific point of the second lateral cable is coupled to the source array cross-cable at a second source array cross-cable connection point, a second lateral cable distal end of the second lateral cable is coupled to the receiver array cross-cable, the specific point of the second lateral cable is different from the second lateral cable distal end of the second lateral cable, the second lateral cable is coupled to the second diverter via the receiver array cross-cable, the second source array cross-cable connection point is between a second lateral cable proximal end of the second lateral cable and the second diverter via the receiver array cross-cable, the second source array cross-cable connection point is closer to the second diverter than the second lateral cable proximal end, and wherein the first source cable is shorter than the source array cross-cable and the second source cable is shorter than the source array cross-cable.

* * * * *